US012446581B2

(12) United States Patent
Berg et al.

(10) Patent No.: US 12,446,581 B2
(45) Date of Patent: Oct. 21, 2025

(54) AGRICULTURAL COMPOSITIONS FOR USE IN CONTROLLING AND/OR TREATING DISEASE OF VASCULAR TISSUE IN PLANTS

(71) Applicant: ORO AGRI INC., Fresno, CA (US)

(72) Inventors: Paulo Sergio Berg, Londrina (BR); Luis Carlos Caldeira Cavalcante, Arapongas (BR); Marlon Assunção, Carambel (BR)

(73) Assignee: ORO AGRI INC., Fresno, CA (US)

( * ) Notice: Subject to any disclaimer, the term of this patent is extended or adjusted under 35 U.S.C. 154(b) by 913 days.

(21) Appl. No.: 17/310,626

(22) PCT Filed: Feb. 19, 2020

(86) PCT No.: PCT/IB2020/051399
§ 371 (c)(1),
(2) Date: Aug. 13, 2021

(87) PCT Pub. No.: WO2020/170170
PCT Pub. Date: Aug. 27, 2020

(65) Prior Publication Data
US 2022/0095616 A1  Mar. 31, 2022

Related U.S. Application Data

(60) Provisional application No. 62/807,654, filed on Feb. 19, 2019.

(51) Int. Cl.
| | | |
|---|---|---|
| *A01N 43/16* | (2006.01) | |
| *A01N 25/30* | (2006.01) | |
| *C05D 9/02* | (2006.01) | |
| *C05F 11/00* | (2006.01) | |
| *C05G 3/60* | (2020.01) | |

(52) U.S. Cl.
CPC ............. *A01N 43/16* (2013.01); *A01N 25/30* (2013.01); *C05G 3/60* (2020.02); *C05D 9/02* (2013.01); *C05F 11/00* (2013.01)

(58) Field of Classification Search
CPC ........ A01N 25/02; A01N 25/30; A01N 43/16; A01N 61/00; A01N 65/36
See application file for complete search history.

(56) References Cited

U.S. PATENT DOCUMENTS

| | | | |
|---|---|---|---|
| 4,544,666 A | 10/1985 | Thirumalachar et al. | |
| 4,673,687 A | 6/1987 | Thirumalachar et al. | |
| 6,258,369 B1* | 7/2001 | Pullen | C07G 99/00 |
| | | | 435/243 |
| 2008/0214400 A1* | 9/2008 | Pullen | A61K 36/752 |
| | | | 514/762 |
| 2010/0074972 A1 | 3/2010 | Rouseff et al. | |
| 2011/0021463 A1 | 1/2011 | Musson | |
| 2011/0281725 A1* | 11/2011 | Pullen | A01N 25/30 |
| | | | 504/362 |
| 2013/0266535 A1 | 10/2013 | Stelinski et al. | |
| 2016/0000093 A1 | 1/2016 | Lamb et al. | |
| 2016/0186201 A1 | 6/2016 | Xoconostle Cázares et al. | |
| 2018/0168170 A1 | 6/2018 | Lamb et al. | |
| 2019/0029250 A1 | 1/2019 | Desanto | |

FOREIGN PATENT DOCUMENTS

| | | |
|---|---|---|
| CA | 2828237 | 9/2012 |
| CN | 101514132 A * | 8/2009 |
| CN | 102655742 | 9/2012 |
| CN | 104381251 | 3/2015 |
| CN | 106561717 A | 4/2017 |
| CN | 108056971 | 5/2018 |
| CN | 108935456 | 12/2018 |
| CN | 110747072 | 2/2020 |
| CU | 23949 B1 | 10/2013 |
| CU | 24371 B1 | 11/2018 |
| EP | 2988590 | 3/2016 |
| JP | 2003-171217 A | 6/2003 |
| JP | 2014511385 | 5/2014 |
| JP | 2018527332 | 9/2018 |
| KR | 20170062382 A | 6/2017 |
| KR | 10-1873359 | 7/2018 |
| WO | WO 2005/079569 | 9/2005 |
| WO | WO 2012/081420 | 6/2012 |
| WO | WO 2017/035192 A1 | 3/2017 |

OTHER PUBLICATIONS

Machine translation of KR 2017-0062382 (2017).*
Machine translation of CN 101514132 (2009).*
HCAPLUS Abstract 2009:1063089 (2009).*
Oil of Citronella General Fact Sheet, National Pesticide Information Center, Oregon State Univeristy, pp. 1-3, 2013.*
International Search Report in International Application No. PCT/IB2020/051399 mailed on Feb. 19, 2020.
Written Opinion of the International Searching Authority of International Application No. PCT/IB2020/051399 mailed on Apr. 15, 2020.
Oil of Citronella General Fact Sheet, National Pesticide Information Center, Oregon State University, pp. 1-3, 2013.

* cited by examiner

*Primary Examiner* — John Pak
(74) *Attorney, Agent, or Firm* — KNOBBE, MARTENS, OLSON & BEAR, LLP

(57) ABSTRACT

Agricultural compositions and/or adjuvants and/or tank mixes including tannic acid to control and/or treat and/or reverse symptoms of diseases or deficiencies related to plants, particularly to vascular and other tissues in plants. Methods for controlling and/or treating vascular disease in plants are also discussed.

10 Claims, 10 Drawing Sheets

Figure 1:
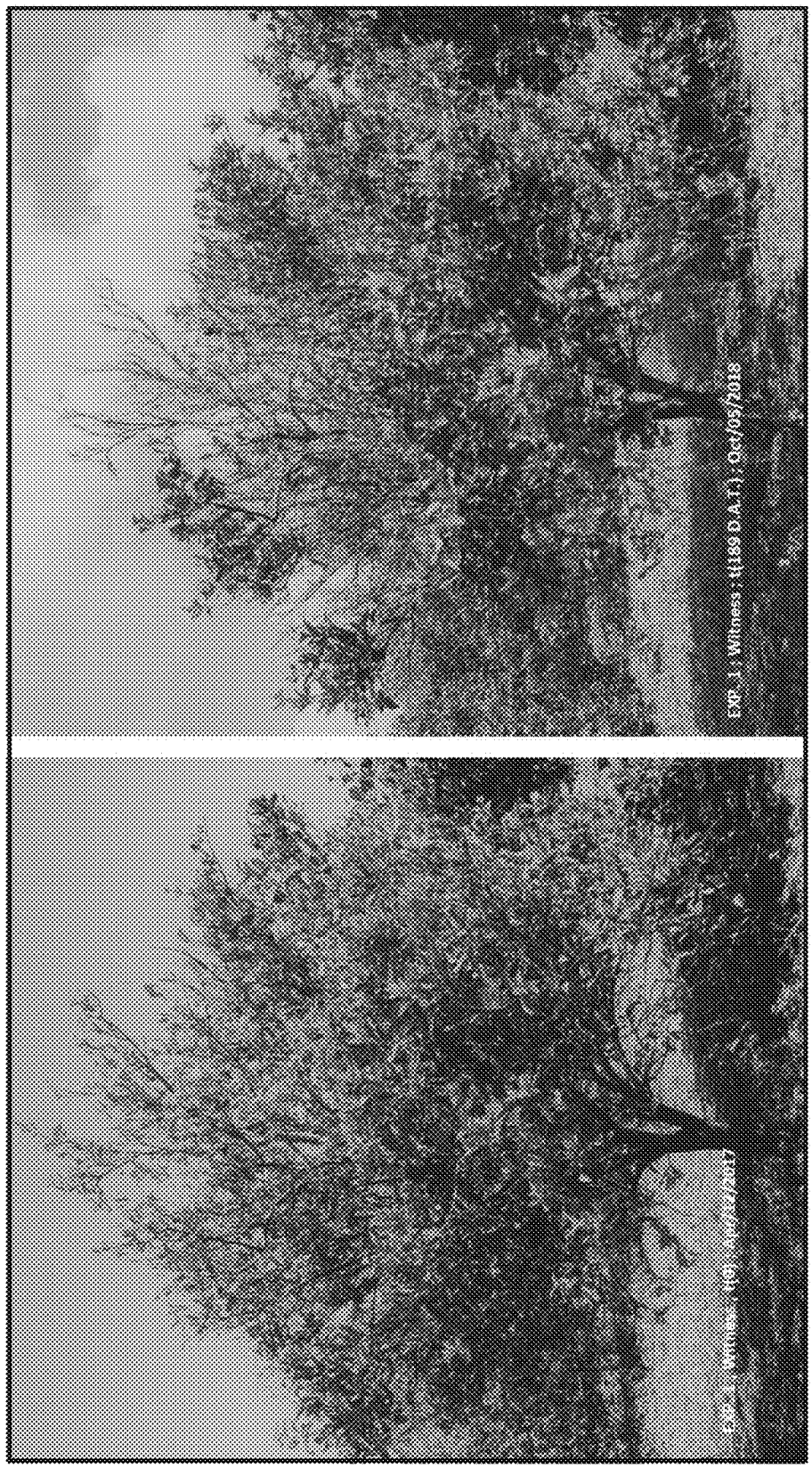
Figure 2:
Figure 3:
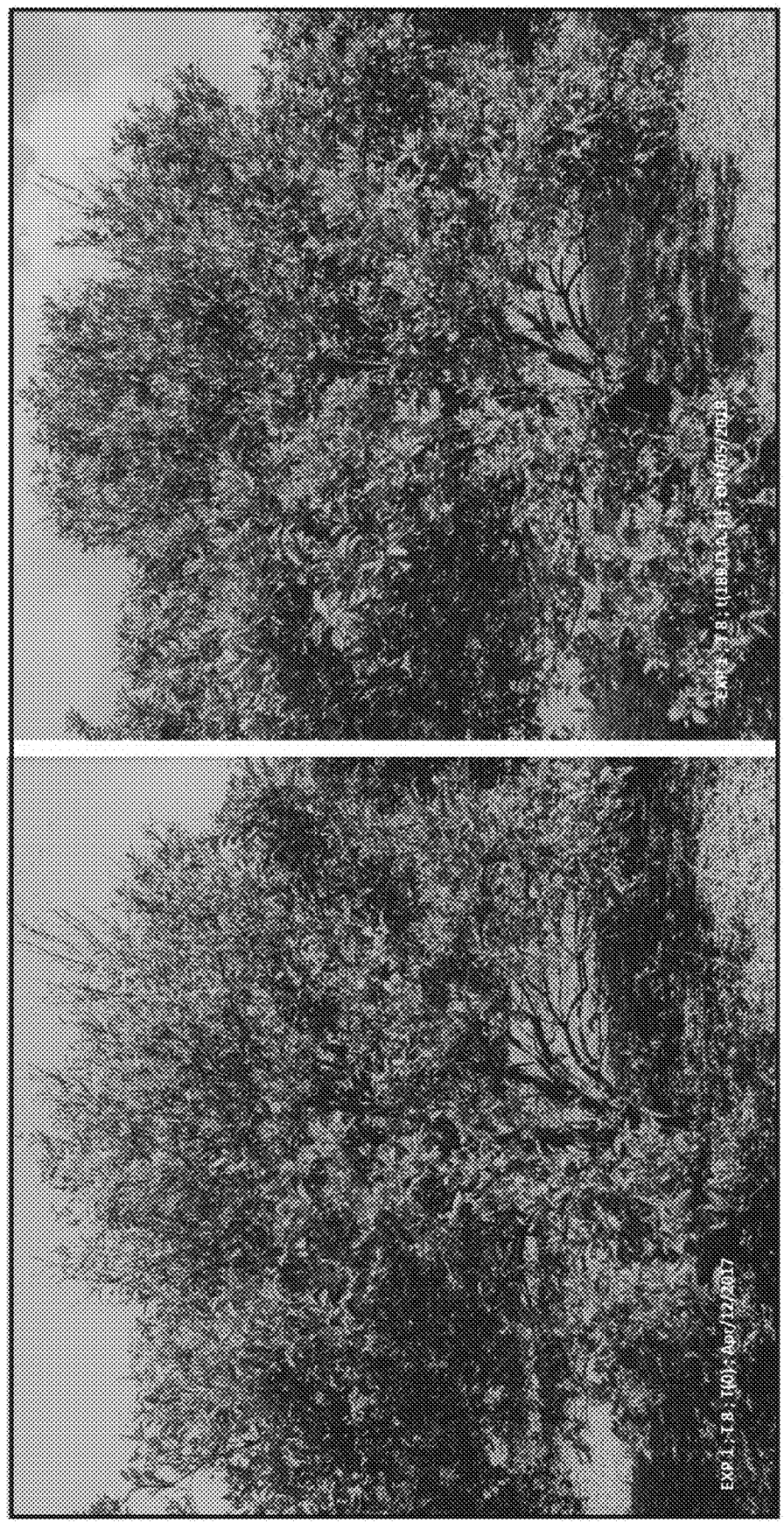
Figure 4:
Figure 5:
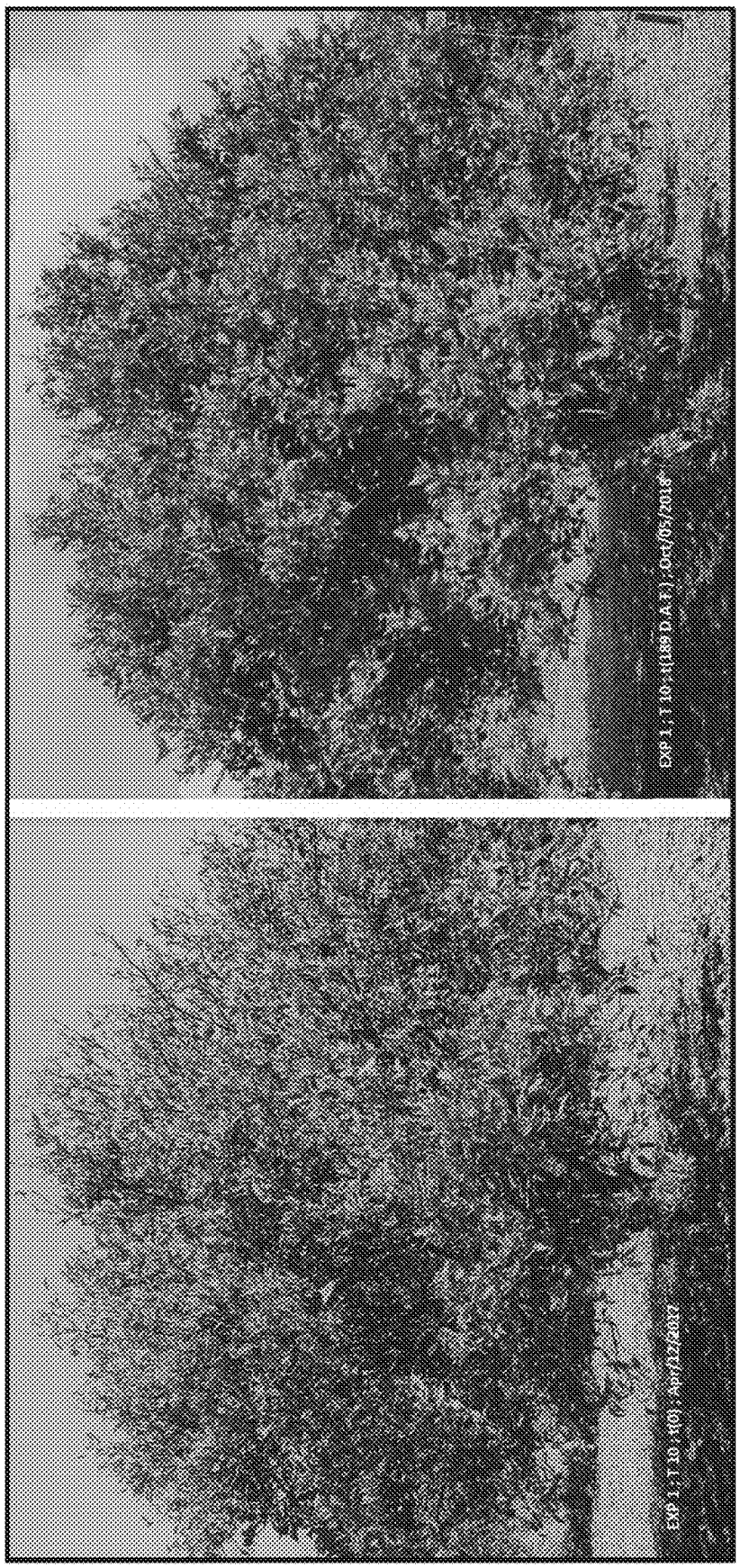
Figure 6:
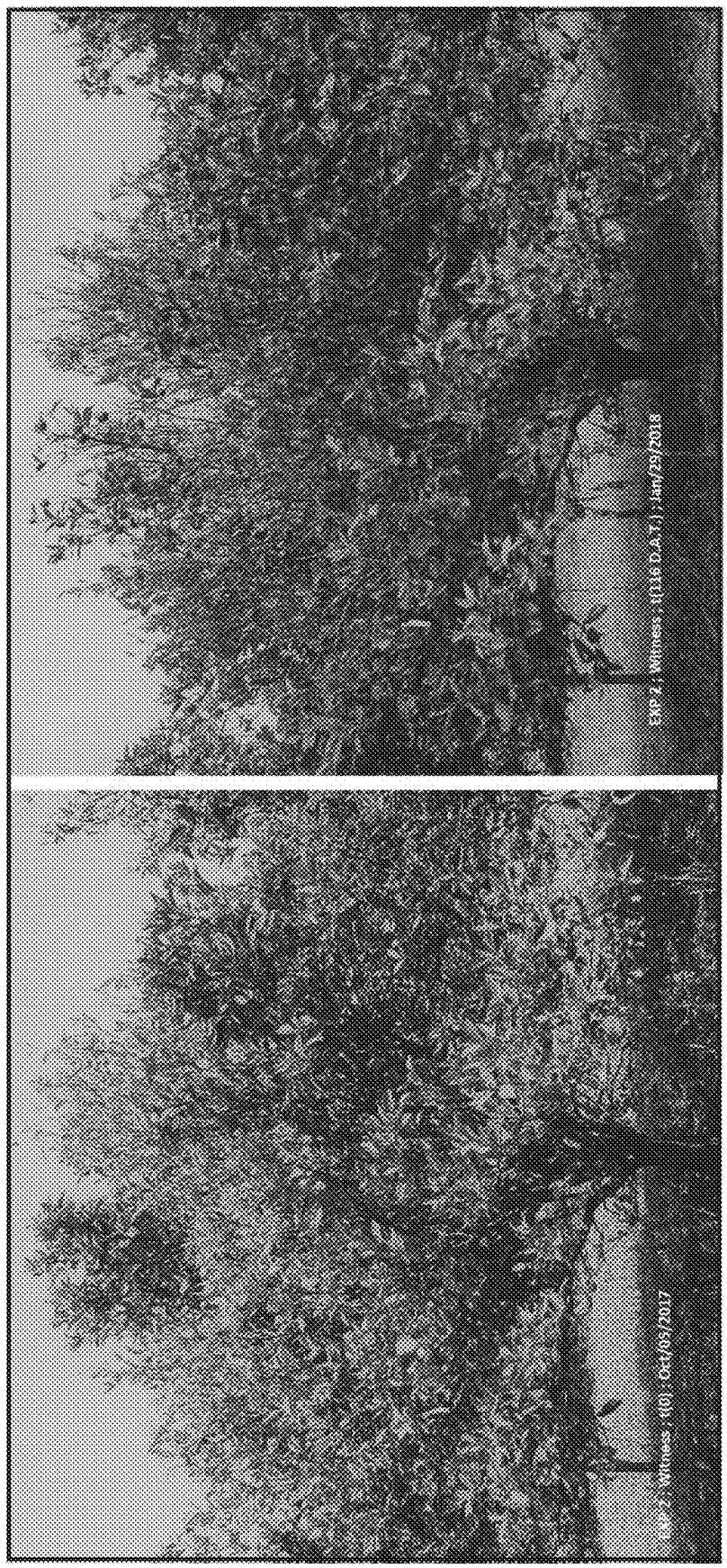

AGRICULTURAL COMPOSITIONS FOR USE IN CONTROLLING AND/OR TREATING DISEASE OF VASCULAR TISSUE IN PLANTS

This application is a U.S. National Phase under 35 U.S.C. § 371 of International Application PCT/IB2020/051399, filed Feb. 19, 2020, designating the U.S., and published in English as WO 2020/170170 on Aug. 27, 2020, which claims priority to U.S. Provisional Application No. 62/807,654, filed Feb. 19, 2019, the entire contents of each of which are incorporated herein by reference.

FIELD OF THE INVENTION

This invention relates to agricultural compositions and/or adjuvants and/or tank mixes to control and/or treat and/or reverse symptoms of diseases or deficiencies related to plants, particularly to vascular and other tissues in plants. Particularly, this invention relates to agricultural compositions and/or adjuvants and/or tank mixes to control and/or treat and/or reverse the symptoms of *Citrus* greening disease or Haunglongbing (HLB) in *Citrus* plants. The invention also relates to methods of controlling and/or treating vascular disease in plants.

BACKGROUND OF THE INVENTION

Plant pathogens hinder the production of optimal yields within the agricultural sector and are a general threat to food security if left unmanaged. Effective management of plant pathogens is an expensive and technically challenging task for farmers, agricultural companies, institutes and research centers around the world. Certain pathogens cause diseases that cannot be effectively managed, treated or cured resulting in crop loss, and/or the need for crop replacement. Pathogens impacting vascular tissue of plants are particularly important to manage or control since healthy vascular tissue is of paramount importance to general plant health and biological function.

A vascular bundle is a part of the transport system in vascular plants. The transport itself happens in vascular tissue, which exists in two forms, i.e. xylem and phloem.

Xylem consists of tracheary elements, through which sap flows, and the living and structural tissues (parenchyma and fibers) that surround and support them. Tracheary elements, made of vessels in angiosperms and tracheids in gymnosperms and more evolutionarily basal vascular plants, form a network of interwoven pipes, made of dead, hollow cells, joined end-to-end. Phloem is another set of pipes made of living cells that moves solutions within the plant with the aid of metabolized energy. The xylem and the phloem together comprise the vascular system in most land plants and evolved not long after plants colonized land.

The two main functions of the xylem hydraulic network in vascular plants are (i) to supply water and minerals to all tissues and (ii) to provide mechanical support.

Vascular diseases caused by bacteria often result in bacteria to auto-aggregate into cell masses and migrate against the transpiration-induced flow of xylem sap thereby plugging the channels.

A number of plant pathogenic bacterial species inhabit the water-conducting xylem vessels of plants where they develop biofilms, large aggregates of cells that block xylem sap flow, or produce plant cell degrading enzymes. These actions result in wilting of the plant, decreased yield, and in many instances death of the plant—all of which impact the grower and consumer. Plants affected range from woody plants like grapevine, to vegetables such as tomato and cabbage.

How the bacteria spread in and colonize the vascular system is poorly understood. In particular, it is poorly understood how bacteria migrate against the direction of sap flow has long been a puzzle and an important problem in explaining spread of the bacteria within many plant hosts. Better control measures in disease regulation is thus continuously sought.

A very serious bacterial disease that affects and threatens *Citrus* production worldwide is Haunglongbing disease (HLB) also known as *Citrus* greening disease, which has devastated *Citrus* crops mainly in Asia, Brazil and the USA. HLB is a very serious bacterial disease that affects and threatens *Citrus* production worldwide. The causal agent for HLB has been identified as three related but distinct Gram-negative phloem-inhabiting α-Proteobacteria, namely "*Candidatus Liberibacter asiaticus*" (CLas), "*Ca. africanus*" (IC:Laf), and "*Ca. L. americanus*" (CLam). The primary vector for spreading the pathogen is psyllid, typically *Diaphorina citri* or *Trioza erytreae*. Further spreading can take the form of propagation of infected material. A three-legged disease control protocol is recommended including (i) inoculum reduction by the removal of trees with HLB disease, (ii) control of psyllid vector populations, and (iii) production of healthy trees for planting.

Conducting basic research into HLB has been particularly difficult as the pathogenic bacteria are very difficult to cultivate in a laboratory environment, and consequently the exact mechanism of action is not well understood. It is known that the pathogen penetrates the phloem and attacks the vascular system, clogging phloem therein preventing proper transport of water and nutrients. Functioning of the phloem is closely connected to the functioning of the xylem and the functioning of the rest of the tree. Blockage of the phloem by the bacteria prevents proper sap flow, results in the uneven spread of nutrients, and results in the accumulation of starch in certain foliar parts, thus starving the roots of carbohydrate nutrition. This damage to the phloem occurs over the whole plant, from the root tips to the leaves and fruit. Functioning of the xylem is closely connected to that of the phloem, so that the whole vascular system will be affected by HLB. Due to this interconnectivity in functioning between xylem and phloem, any disease affecting the xylem will by the same physiological association effect the phloem.

Huanglongbing disease (HLB) is the most destructive *Citrus* related disease and is globally widespread posing a threat to global *Citrus* production. Typical symptoms of the disease include yellowing of leaves, poor growth, reduced production of *Citrus* fruits, smaller fruits, distorted fruits, lighter fruits, and plant death. There is currently no means to ameliorate the effect of HLB and the disease causes death of the infected plant within three to five years. Blotchy mottle is the most important leaf symptom for diagnosis.

The disease symptoms are related to the process of bacterial colonization in the vessel tissues (phloem and xylem) resulting in the cessation or hinderance of solute transport to the other parts of the plant. As discussed, once infected the ensuing bacterial infection impedes the vascular system of the tree and inhibits movement of nutrients. Consequently, effective delivery of antibacterial agents becomes more and more difficult as the disease progresses.

There are no effective or low-cost control practices, or curative methods, for HLB. Considering the rapid expansion of the disease and the lack of curative practices, there is an urgent need to reduce the inoculum of HLB (diseased plants).

Owing to the ill understood pathological mechanism of action, instead of focusing on controlling the bacterial pathogen, many treatment protocols to date have focused on controlling vector populations. Consider for example U.S. Pub. No. 2010/0074972 A1.

In another U.S. patent application published as U.S. Pub. No. 2011/0021463 the invention tries to target the pathogen itself with phosphonic acid providing that said phosphonic acid inhibits the metabolic process of oxidative phosphorylation in the pathogen. Despite efforts to develop mitigation treatments none have so far been effective in reversing the effects of the disease on the trees, and world-wide the *Citrus* industry is at risk unless the effects of HLB on trees can be successfully arrested, controlled and/or reversed.

European Patent Appl. No. 2988590 and U.S. Pub. No. 2016/0186201 disclose the generation of transgenic plants resistant to infections caused by microorganisms restricted to the phloem, and comprises the induction of the expression of a chimeric or fusion protein, which comprises a phloem protein of *Citrus aurantifolia* (CsPP16), a linker protein and a protein with antimicrobial activity. The plant incorporates in its genome a chimeric gene encoding the fusion protein that acts as a transporter inside the vascular tissue of the plant.

PCT patent application published as WO 2005/079569 discloses a composition of nanocrystalline silver used to preserve plant material and particularly the prevention of the growth of microorganisms.

U.S. Pub. No. 2013/0266535 A1 discloses to insect attractants, methods for monitoring infestation of *Citrus* plants, and methods for diverting vectors of HLB away from a predetermined *Citrus* growth.

Stelinski et al. 2013, identify that Las-infected plants were deficient in N, P, Mg, Zn and Fe, but were characterized by higher concentrations of K and B. Nwugo et al. BMC Plant Biology 2013 characterizes the interrelationships between protein expression and nutritional status of Las-infected pre-symptomatic or symptomatic grapefruit plants. Nwugo et al. showed a general decrease in nutrient concentrations due to Las-infection particularly those of Fe, Zn, and Cu but an increase in K levels. Nwugo et. al. propose that the physiological and molecular processes associated with the response of grapefruit plants to Las infection involves: a general decrease in nutrient concentration resulting in the reduced production of proteins associated with photosynthesis, energy production, regulation and protein synthesis/transport; an increase in K concentration to support the activity of an increased production of starch anabolism-related proteins; and an increase in the production of peroxiredoxins, Cu/Zn SOD and pathogen response-related proteins.

Despite all the above, there is at present no cure or effective treatment for HLB affected trees, and any infected plant eventually dies. Efforts to develop mitigation treatments have so far not been effective in reversing the effects of the disease on the trees.

The Applicant has now surprisingly found an agricultural composition and/or a liquid agricultural adjuvant and/or a tank mix and/or a method described herein that each at least ameliorates the disadvantages known in the prior art. The agricultural compositions and/or liquid agricultural adjuvants and/or tank mix and/or method herein may be for use in controlling and/or treating disease in plants caused by microorganisms (including bacteria and/or fungi), viruses and pests. Without being limited to theory, the invention herein described provides for vascular dilation of the vascular system of plants improving sap mobility resulting in improvements in absorption of nutrients and/or medicinal compounds and/or beneficial compounds providing improved levels of photosynthesis. Additionally, or alternatively, the invention herein described may facilitate degradation of foreign blockages caused by microorganisms (including bacteria and/or fungi), viruses or pests within the vascular system of plants improving sap mobility resulting in improvements in absorption of nutrients and/or medicinal compounds and/or beneficial compounds providing improved levels of photosynthesis.

SUMMARY OF THE INVENTION

The invention provides an agricultural composition and/or a liquid agricultural adjuvant and/or a tank mix and/or a method for improving plant health and keeping under control phytopathogenic bacteria and/or endophytic microorganisms in a plant. For example, the invention provides means to ameliorate symptoms of *Citrus* greening or Haunglongbing disease (HLB) caused by the pathogenic bacteria *Candidatus Liberibacter* in *Citrus* plants. The agricultural composition and/or liquid agricultural adjuvant may include tannic acid. The agricultural composition may be provided as a solid, liquid, gel or other form. When in use, the agricultural composition and/or adjuvant promotes vascular dilation of plant tissues resulting in a recovery and/or improvement and/or increase in the levels of photosynthesis, and/or improved plant health resulting in the amelioration of symptoms of HLB.

Surprisingly, application of the agricultural compositions and/or liquid agricultural adjuvants and/or tank mixes described herein to *Citrus* trees suffering from HLB resulted in the water balance in the trees being restored by allowing the xylem vascular bundles that are the main upwards transport route for water to resume their function. New leaves assumed a healthy green color. This resulted in recovery of photosynthesis to normal levels. This recovery of the trees affected by HLB is surprising as previous efforts by application of ameliorants such as macro and micronutrients have been ultimately unsuccessful.

Without being limited to theory, the Applicant also believes that dilation of the vascular tissue also promotes more effective delivery of bactericides to the bacterial pathogen itself, and may allow for its effective eradication. Additionally, or alternatively, the invention herein described may facilitate degradation of foreign blockages caused by microorganisms (including bacteria and/or fungi), viruses or pests within the vascular system of plants improving sap mobility resulting in improvements in absorption of nutrients and/or medicinal compounds and/or beneficial compounds providing improved levels of photosynthesis.

An improved agricultural composition and/or adjuvant and/or tank mix and/or method of dilating vascular tissue in plants, to treat and/or contain and/or control and/or reverse symptoms of diseases or deficiencies related with vascular and other plant tissues is provided by the present invention.

Broadly, the invention provides tannic acid for use in the treatment and/or control of vascular disease in plants, preferably *Citrus* greening disease or Haunglongbing disease (HLB) in *Citrus* plants.

The tannic acid may be a specific form of tannin, a type of polyphenol, may be synthetic or naturally produced by extraction with water or organic solvents and may be produced from at least one of, but not limited to, the following group: Tara pods (*Caesalpinia spinosa*), Gallnuts (*Rhus semialata* or *Quercus infectoria*), Sicilian Sumac leaves (*Rhus coriaria*), Turkish or Chinese nutgall (*Rhus* species), European chestnut tree (*Castanea sativa*), the American chestnut oak (*Quercus prinus*) and wattles (*Acacia* species).

The tannic acid may be formulated as at least one of, but not limited to, the group comprising: solids, liquids, and gels.

The tannic acid may further comprise other chemistries to provide an agricultural composition.

The tannic acid, or the agricultural composition including same, may be provided in a concentrated or dilute form. The composition may be stable.

In accordance with a first aspect of this invention there is provided an agricultural composition for use in controlling and/or treating *Citrus* greening disease or Haunglongbing disease (HLB), said agricultural composition including tannic acid. The composition may typically be stable.

The tannic acid may be a specific form of tannin, a type of polyphenol, may be synthetic or naturally produced by extraction with water or organic solvents and may be produced from at least one of, but not limited to, the following group: Tara pods (*Caesalpinia spinosa*), Gallnuts (*Rhus semialata* or *Quercus infectoria*), Sicilian Sumac leaves (*Rhus coriaria*), Turkish or Chinese nutgall (*Rhus* species), European chestnut tree (*Castanea sativa*), the American chestnut oak (*Quercus prinus*) and wattles (*Acacia* species).

The agricultural composition may further include a nutrient compound provided as a fertilizer composition. The fertilizer composition may include, but is not limited to, the following group: nitrogen (N), phosphorous (P), potassium (K), calcium (Ca), magnesium (Mg), sulfur (S), boron (B), cobalt (Co), copper (Cu), iron (Fe), manganese (Mn), molybdenum (Mo), nickel (Ni), selenium (Se), silicon (Si) or zinc (Zn), wherein soluble or insoluble sources of nutrients may be, among others, salts of ammonium, nitrate, chloride, carbonate, phosphate, phosphite, sulfate, molybdate, acetate, citrate, formate, borate, thiosulphate, silicate or an acid, an amide, an amine, an hydroxide, an oxide. It is to be understood that various other nutrient compounds are envisaged. In a certain embodiment the fertilizer composition may be monoethanolamine borate.

The agricultural composition may further include an adjuvant.

The agricultural composition may further include a surfactant. The surfactant may be at least one anionic and/or at least one nonionic and/or both anionic and nonionic surfactants.

The at least one anionic surfactant may be selected from, but not limited to, the group comprising: ($C_6$-$C_{18}$) alkyl benzene sulfonic acid salts, calcium dodecylbenzene sulfonate, sodium dodecylbenzene sulfonate, sodium alkyl benzene sulfonate, amine ($C_6$-$C_{18}$) alkyl benzene sulfonate, triethanolamine dodecylbenzene sulfonates, ($C_6$-$C_{18}$) alkyl ether sulfates, ($C_6$-$C_{18}$) alkyl ethoxylated ether sulfates, ($C_6$-$C_{18}$) alkyl sulfates, sodium lauryl ether sulfate, lauryl ether polyethoxylated sodium sulfate, ($C_6$-$C_{18}$) alkyl phosphate esters, ($C_6$-$C_{18}$) alkoxylated sulfates, ($C_6$-$C_{18}$) alkoxylated phosphate esters, xylene sulfonate salts, cumene sulfonate salts, and combinations thereof.

The at least one nonionic surfactant may be selected from, but not limited to, the group comprising: natural and/or synthetic ($C_8$-$C_{22}$) alkoxylated fatty alcohols, ($C_8$-$C_{22}$) ethoxylated fatty alcohols, ($C_8$-$C_{22}$) propoxylated fatty alcohols, ($C_8$-$C_{22}$) ethoxylated and propoxylated fatty alcohols, straight chain ($C_4$-$C_{10}$) alkyl(poly)glycosides, branched chain ($C_4$-$C_{10}$) alkyl(poly)glycosides; and alkoxylated sorbitan fatty esters, alkoxylated sorbitol fatty esters, ethoxylated sorbitan fatty esters, ethoxylated sorbitol fatty esters, polyoxyethylene sorbitan monolaurate, polyoxyethylene sorbitan monopalmitate, polyoxyethylene sorbitan monostearate, and combinations thereof.

The ethoxylated fatty alcohols of fatty acids may have a degree of ethoxylation of from 1 to 50, more preferably 2 to 30, most preferably 3 to 10.

Some alkoxylated alcohols contemplated for use include those based on branched alcohols, such as the Guerbet alcohols, e.g. 2-propylheptanol and 2-ethylhexanol, and $C_{10}$-OXO-alcohol or $C_{13}$ OXO-alcohol, i.e. an alcohol mixture whose main component is formed by at least one branched $C_{10}$-alcohol or $C_{13}$-alcohol, and the alcohols commercially available as Exxal alcohols from Exxon Mobile Chemicals and Neodol alcohols from Shell Chemicals.

The agricultural composition may further include an additive. The additive may be at least one selected from, but not limited to, the group comprising: preservatives, clarifiers, anti-freezing agents, hydrotropes, stabilizers, antioxidants, acidifiers, chelates, complexing agents, dyes, rheology modifiers, antifoams, anti-drift and water, oil or other solvents, and combinations thereof The agricultural composition may further include at least one essential oil. The at least one essential oil may be a natural compound, such as a *Citrus* oil, a component of a *Citrus* oil, a terpene oil, wherein the terpene oil comprises a d-limonene or one or more terpene containing natural oils, wherein the one or more terpene containing natural oils contains at least 50% of a terpene, wherein the essential oil is selected from the group consisting of orange oil, grapefruit oil, lemon oil, lime oil, tangerine oil, murcott mandarin oil, citronella oil, other *Citrus* oil, or combinations thereof.

The agricultural composition may further include water.

The agricultural composition may further a biocide selected from, but not limited to the group comprising: bactericides, fungicides, herbicides, pesticides, miticides, ovicides, insecticides, nematicides and combinations thereof.

The agricultural composition may be provided as a liquid. Alternatively and/or additionally, the agricultural composition may be provided as a solid, preferably the solid may be provided as a powder. The Applicant envisages various formulation types including but not limited to: a) solids: a powder, a water dispersible powder, a water soluble powder, dustable powder, a flo-dust, a crystal, a granule, a water dispersible granule, a water soluble granule, an encapsulated granule, a fine granule, a microgranule, a self-dispersible floating granule, a capsule, a microcapsule, a pellet, a dispersible concentrate, a dry flowable, a water dispersible pellet, a water soluble pellet, a tablet, a water dispersible tablet a briquette, a flake, and combinations thereof; b) liquids: a solution, a concentrate solution, an aqueous solution, an aqueous suspension, a liquid extract, a liquid cream, a liquid-concentration, a suspension, a concentrate suspension, a microcapsule suspension, and combinations thereof; c) fluids: a paste, a liquid paste, a paste concentrate, a slurry, a water dispersible slurry, a gel, a liquid soluble gel, and combinations thereof.

The agricultural composition may be provided in a concentrate form and/or in a dilute form. The concentrate agricultural composition may be diluted before use in the method, preferably the diluent may be water. It is to be understood that various additional and/or alternative chemistries are envisaged as diluents.

When in use in the method, the agricultural composition (in concentrate or dilute form) may be added in a tank mix in a ratio of from about 0.01 kg to about 5.0 kg per hectare or from about 0.01 to about 5.0 liters per hectare. Various tank mix ratios are envisaged by the Applicant.

In an embodiment of the invention, the agricultural composition includes:

tannic acid in a dry concentrate form or in a diluted form used as tank mix from 0.01% to 1.0% or added into fertilizer composition containing from 0.1 to 50.0% of relative tannic acid and; wherein the fertilizer composition containing from 0.1 to 80.0% of relative nutrient or nutrients and the fertilizer may include a source of nitrogen (N), phosphorous (P), potassium (K), calcium (Ca), magnesium (Mg), sulfur (S), boron (B), cobalt (Co), copper (Cu), iron (Fe), manganese (Mn), molybdenum (Mo), nickel (Ni), selenium (Se), silicon (Si) or zinc (Zn) and; wherein the agricultural composition may be added in a tank mix in a ratio from 0.1 to 20.0 kg per hectare or from 0.1 to 20.0 liters per hectare as a treatment of vascular diseases of plants applied in tank mix with other chemistries; or wherein the tannic acid in concentrate form or in a diluted form is added in a tank mix in a ratio from 0.01 to 5.0 kg per hectare or from 0.01 to 5.0 liters per hectare as a treatment of vascular diseases of plants applied in a tank mix with one or more nutrients and with other chemistries. The agricultural compositions may be useful in biocidal, bactericidal, pesticidal and/or fungicidal applications.

In accordance with a second aspect of this invention there is provided a liquid agricultural adjuvant for use in controlling and/or treating *Citrus* greening disease or Haunglongbing disease (HLB), the liquid agricultural adjuvant comprising:

at least one essential oil, preferably a terpene;
at least one anionic surfactant;
at least one nonionic surfactant; and
tannic acid.

The liquid agricultural adjuvant having about 0.1 wt. % to about 20 wt. % of terpene, about 0.1 wt. % to about 25 wt. % of tannic acid, the at least one anionic surfactant may be present in an amount of between about 1 wt. % to about 50 wt. %, and the at least one nonionic surfactant may be present in an amount of between about 1 wt. % to about 50 wt. %, therein providing the liquid agricultural adjuvant in concentrate form.

The liquid agricultural adjuvant may further include a nutrient compound provided as a fertilizer composition. The fertilizer composition may include, but is not limited to, the following group: nitrogen (N), phosphorous (P), potassium (K), calcium (Ca), magnesium (Mg), sulfur (S), boron (B), cobalt (Co), copper (Cu), iron (Fe), manganese (Mn), molybdenum (Mo), nickel (Ni), selenium (Se), silicon (Si) or zinc (Zn), wherein soluble or insoluble sources of nutrients may be, among others, salts of ammonium, nitrate, chloride, carbonate, phosphate, phosphite, sulfate, molybdate, acetate, citrate, formate, borate, thiosulphate, silicate or an acid, an amide, an amine, an hydroxide, an oxide. It is to be understood that various other nutrient compounds are envisaged. In a certain embodiment the fertilizer composition may be monoethanolamine borate.

In a certain embodiment of the invention, the fertilizer composition contains from about 0.1 to about 80.0% of relative nutrient or nutrients.

The liquid agricultural adjuvant (concentrate form) may be diluted with water or other solvents to provide a diluted form. In use, the concentrate and/or dilute form may be tank mixed with other chemistries and/or fertilizers compositions and/or plant protection products (including pesticides and/or fungicides).

The tannic acid may be a specific form of tannin, a type of polyphenol, may be synthetic or naturally produced by extraction with water or organic solvents and may be produced from at least one of, but not limited to, the following group: Tara pods (*Caesalpinia spinosa*), Gallnuts (*Rhus semialata* or *Quercus infectoria*), Sicilian Sumac leaves (*Rhus coriaria*), Turkish or Chinese nutgall (*Rhus* species), European chestnut tree (*Castanea sativa*), the American chestnut oak (*Quercus prinus*) and wattles (*Acacia* species). In a certain embodiment of the second aspect, tannic acid is added in a tank mix at a ratio from about 0.1 to about 20.0 kg per hectare or from about 0.1 to about 20.0 liters per hectare.

The at least one essential oil may be a natural compound, such as a *Citrus* oil, a component of a *Citrus* oil, a terpene oil, wherein the terpene oil comprises a d-limonene or one or more terpene containing natural oils, wherein the one or more terpene containing natural oils contains at least 50% of a terpene, wherein the essential oil is selected from the group consisting of orange oil, grapefruit oil, lemon oil, lime oil, tangerine oil, murcott mandarin oil, citronella oil, other *Citrus* oil, or combinations thereof.

The at least one anionic surfactant may be selected from, but not limited to, the group comprising: ($C_6$-$C_{18}$) alkyl benzene sulfonic acid salts, calcium dodecylbenzene sulfonate, sodium dodecylbenzene sulfonate, sodium alkyl benzene sulfonate, amine ($C_6$-$C_{18}$) alkyl benzene sulfonate, triethanolamine dodecylbenzene sulfonates, ($C_6$-$C_{18}$) alkyl ether sulfates, ($C_6$-$C_{18}$) alkyl ethoxylated ether sulfates, ($C_6$-$C_{18}$) alkyl sulfates, sodium lauryl ether sulfate, lauryl ether polyethoxylated sodium sulfate, ($C_6$-$C_{18}$) alkyl phosphate esters, ($C_6$-$C_{18}$) alkoxylated sulfates, ($C_6$-$C_{18}$) alkoxylated phosphate esters, xylene sulfonate salts, cumene sulfonate salts, and combinations thereof.

The at least one nonionic surfactant may be selected from, but not limited to, the group comprising: natural and/or synthetic ($C_8$-$C_{22}$) alkoxylated fatty alcohols, ($C_8$-$C_{22}$) ethoxylated fatty alcohols, ($C_8$-$C_{22}$) propoxylated fatty alcohols, ($C_8$-$C_{22}$) ethoxylated and propoxylated fatty alcohols, straight chain ($C_4$-$C_{10}$) alkyl(poly)glycosides, branched chain ($C_4$-$C_{10}$) alkyl(poly)glycosides; and alkoxylated sorbitan fatty esters, alkoxylated sorbitol fatty esters, ethoxylated sorbitan fatty esters, ethoxylated sorbitol fatty esters, polyoxyethylene sorbitan monolaurate, polyoxyethylene sorbitan monopalmitate, polyoxyethylene sorbitan monostearate, and combinations thereof.

The ethoxylated fatty alcohols of fatty acids may have a degree of ethoxylation of from 1 to 50, more preferably 2 to 30, most preferably 3 to 10.

Some alkoxylated alcohols contemplated for use include those based on branched alcohols, such as the Guerbet alcohols, e.g. 2-propylheptanol and 2-ethylhexanol, and $C_{10}$-OXO-alcohol or $C_{13}$ OXO-alcohol, i.e. an alcohol mixture whose main component is formed by at least one branched $C_{10}$-alcohol or $C_{13}$-alcohol, and the alcohols commercially available as Exxal alcohols from Exxon Mobile Chemicals and Neodol alcohols from Shell Chemicals.

The liquid agricultural adjuvant may further comprise an additive selected from, but not limited to, the group comprising: preservatives, clarifiers, anti-freezing agents, hydrotropes, stabilizers, antioxidants, acidifiers, chelates, complexing agents, dyes, rheology modifiers, antifoams, anti-drift and water, oil or other solvents, and combinations thereof.

In certain embodiments of the invention, the at least one essential oil may be present in an amount of between about 0.1 wt. % to about 20 wt. %, the tannic acid may be present in an amount of between about 0.1 wt. % to about 25 wt. %, the at least one anionic surfactant may be present in an amount of between about 1 wt. % to about 50 wt. %, and the at least one nonionic surfactant may be present in an amount of between about 1 wt. % to about 50 wt. %. This embodiment may provide the liquid agricultural adjuvant in concentrate form. It is to be understood that the liquid agricultural adjuvant may further be diluted with water or other solvents.

In other embodiments of the invention, the at least one essential oil may be present in an amount of between about 0.1 wt. % to about 15 wt. %, preferably between about 2 wt. % to about 10 wt. %, the tannic acid may be present in an amount of between about 0.1 wt. % to about 20 wt. %, preferably between about 3 wt. % to about 10 wt. %, the at least one anionic surfactants may be present in an amount of between about 3 wt. % to about 20 wt. %, and wherein the at least one nonionic surfactant is present in an amount of between about 5 wt. % to about 30 wt. %. This embodiment may provide the liquid agricultural adjuvant in concentrate form. It is to be understood that the liquid agricultural adjuvant may further be diluted with water or other solvents.

The liquid agricultural adjuvant may further comprise water and/or other additives, typically such that the liquid agricultural adjuvant may comprise from about 0.1 to about 20 wt. % of the at least one essential oil high terpene contend; and from about 0.1 wt. % to about 25 wt. % of tannic acid; and from about 1 to about 50 wt. % of the at least one anionic surfactant; and from about 1 to about 50 wt. % of the at least one nonionic surfactant, and from about 2 to about 80 wt. % of the water and/or other additives. This embodiment may still provide the liquid agricultural adjuvant in concentrate form.

In an example embodiment of the invention there is provided a liquid agricultural adjuvant comprising at least one essential oil (typically a high terpene contend) present in an amount of between about 0.1 wt. % to about 20 wt. %, preferably between about 2 wt. % to about 10 wt. %; the tannic acid is present in an amount of between 0.1 wt. % to about 25 wt. %, preferably between about 3 wt. % to about 10 wt. %; the at least one anionic surfactant present in an amount of between about 3 wt. % to about 20 wt. %; and the at least one nonionic surfactant present in an amount of between about 5 wt. % to about 30 wt. %; and wherein the at least one essential oil high terpene contend may be a natural compound, such as an essential oil, a *Citrus* oil, a component of a *Citrus* oil, a terpene oil, wherein the terpene oil comprises a d-limonene or one or more terpene containing natural oils, wherein the one or more terpene containing natural oils contains at least 50% of a terpene, wherein the essential oil is selected from the group consisting of orange oil, grapefruit oil, lemon oil, lime oil, tangerine oil, murcott mandarin oil, citronella oil, other *Citrus* oil, or combinations thereof; and wherein the at least one anionic surfactant is selected from, but not limited to, the group comprising: ($C_6$-$C_{18}$) alkyl benzene sulfonic acid salts, calcium dodecylbenzene sulfonate, sodium dodecylbenzene sulfonate, sodium alkyl benzene sulfonate, amine ($C_6$-$C_{18}$) alkyl benzene sulfonate, triethanolamine dodecylbenzene sulfonates, ($C_6$-$C_{18}$) alkyl ether sulfates, ($C_6$-$C_{18}$) alkyl ethoxylated ether sulfates, ($C_6$-$C_{18}$) alkyl sulfates, sodium lauryl ether sulfate, lauryl ether polyethoxylated sodium sulfate, ($C_6$-$C_{18}$) alkyl phosphate esters, ($C_6$-$C_{18}$) alkoxylated sulfates, ($C_6$-$C_{18}$) alkoxylated phosphate esters, xylene sulfonate salts, cumene sulfonate salts, and combinations thereof; and wherein the at least one nonionic surfactant is selected from, but not limited to, the group comprising: ($C_8$-$C_{22}$) alkoxylated fatty alcohols, ($C_8$-$C_{22}$) ethoxylated fatty alcohols, ($C_8$-$C_{22}$) propoxylated fatty alcohols, ($C_8$-$C_{22}$) ethoxylated and propoxylated fatty alcohols, straight chain ($C_4$-$C_{10}$) alkyl(poly)glycosides, branched chain ($C_4$-$C_{10}$) alkyl(poly)glycosides; and alkoxylated sorbitan fatty esters, alkoxylated sorbitol fatty esters, ethoxylated sorbitan fatty esters, ethoxylated sorbitol fatty esters, polyoxyethylene sorbitan monolaurate, polyoxyethylene sorbitan monopalmitate, polyoxyethylene sorbitan monostearate, and combinations thereof.

The example embodiment of the disclosure may further comprise water as a diluent and/or other additives, wherein the liquid agricultural adjuvant comprises from about 0.1 wt. % to about 20 wt. % of the at least one essential oil high terpene contend; and from about 0.1 wt. % to about 25 wt. % of tannic acid; and from about 1 wt. % to about 50 wt. % of the at least one anionic surfactant, and from about 1 wt. % to about 50 wt. % of the at least one nonionic surfactant, and from about 2 wt. % to about 80 wt. % of the water and/or other additives. This embodiment may still provide the liquid agricultural adjuvant in concentrate form.

The additives may be at least one selected from, but not limited to, the group comprising: preservatives, clarifiers, anti-freezing agents, hydrotropes, stabilizers, antioxidants, acidifiers, chelates, complexing agents, dyes, rheology modifiers, antifoams, anti-drift and water, oil or other solvents, and combinations thereof.

The oil may be a natural compound, modified by esterification or transesterification, such as an alkyl fatty acid ester, e.g., methyl esters, ethyl esters, propyl esters, butyl esters, 2-ethylhexyl esters or dodecyl esters, and is preferably a glycol or glycerol fatty acid, such as ($C_{10}$-$C_{22}$) fatty acid esters, such as from vegetables oils, preferably oil-yielding plants species such as soybean, corn, sunflower, rapeseed oil, cottonseed oil, linseed oil, palm oil, safflower, coconut oil, castor oil, olive oil, canola oil among others pure or mixed with an essential or edible oil extracted from a variety of plants or parts of plants such as trees, shrubs, leaves, flowers, grasses, fluids, herbs, fruits and seeds, or mixed with each other that are combined with one or more oils.

In further embodiments, the oil may be a natural compound, such as an essential oil, a *Citrus* oil, a component of a *Citrus* oil, a terpene oil, wherein the terpene oil comprises a d-limonene or one or more terpene containing natural oils, wherein the one or more terpene containing natural oils contains at least 50% of a terpene selected from the group consisting of orange oil, grapefruit oil, lemon oil, lime oil, tangerine oil, murcott mandarin oil, citronella oil, other *Citrus* oil, or combinations thereof.

The liquid agricultural adjuvant (in concentrate form) may contain from 0.1 wt. % to 25 wt. % of tannic acid, and wherein the liquid agricultural adjuvant (in concentrate form) may be an emulsifiable and/or microemulsified liquid adjuvant may be diluted to provide a dilute liquid agricultural adjuvant to be applied in tank mixes or irrigation system mixed with fertilizer nutrients, water or other chemistries at a rate of 1:5000 to 1:10 to be applied via air assisted sprayers, conventional sprayers, ultra-low volumes equipment such as aerial, electrostatic, foggers and misting spray equipment and chemigation systems such as pivots an sprinklers. The liquid agricultural adjuvant may in use provide biocidal characteristics.

The liquid agricultural adjuvant may further a biocide selected from, but not limited to the group comprising: bactericides, fungicides, herbicides, pesticides, miticides, ovicides, insecticides, nematicides and combinations thereof.

In accordance with a third aspect of this invention there is provided a tank mix for application to plants to control and/or treat vascular disease, the tank mix comprising the agricultural composition of the first aspect and/or the liquid agricultural adjuvant of the second aspect being added to a tank mix containing water. The tank mix may preferably be stable.

The tank mix may further a biocide selected from, but not limited to the group comprising: bactericides, fungicides, herbicides, pesticides, miticides, ovicides, insecticides, nematicides and combinations thereof.

The tank mix may include the agricultural composition and/or adjuvant from about 0.1 wt. % to about 25 wt. % of tannic acid.

The tank mix may further include a fertilizer composition, for example a solution of monoethanolamine borate, containing from about 0.1 to about 15.0% of relative boron.

The tank mix may further include a fungicide and/or fertilizer based on elemental sulfur suspension concentrate type containing from 10.0 to 70.0% of relative sulfur.

The tank mix may further include a fungicide composition of copper oxychloride suspension concentrate type containing from 5.0 to 40.0% of relative copper. The tank mix may further include other chemistries.

When in use, a preferred embodiment of the tank mix is formulated such that when applied to plants the tannic acid may be applied from 0.1 to 1.5 liters per hectare; and/or the monoethanolamine borate may be applied from 1.0 to 5.0 liters pers hectare; and/or the concentrate suspension of elemental sulfur may be applied from 1.0 to 4.0 liters per hectare; and/or the concentrate suspension of copper may be applied from 0.5 to 2.0 liters per hectare; and/or wherein the tank mix is applied to the plants at least once, but preferably 6 (six) times, during a season.

It is to be understood that the tank mix may include several other chemistries without departing from the general ambit of the disclosures made herein.

In accordance with a fourth aspect of this invention there is provided a method of controlling and/or treating vascular disease, preferably *Citrus* greening disease or HLB, in plants, the method comprising the step of applying tannic acid, alone or as part of a formulation, to plants in need thereof.

The tannic acid may be a specific form of tannin, a type of polyphenol, may be synthetic or naturally produced by extraction with water or organic solvents and may be produced from at least one of, but not limited to, the following group: Tara pods (*Caesalpinia spinosa*), Gallnuts (*Rhus semialata* or *Quercus infectoria*), Sicilian Sumac leaves (*Rhus coriaria*), Turkish or Chinese nutgall (*Rhus* species), European chestnut tree (*Castanea sativa*), the American chestnut oak (*Quercus prinus*) and wattles (*Acacia* species).

In use, the method provides for dilating of the vascular system and in so doing treats and/or controls disease, particularly *Citrus* greening disease or HLB. In use, the method may also facilitate unblocking bacterial colonies from vascular tissues in plants and in so doing treats and/or controls disease, particularly *Citrus* greening disease or HLB.

The method may include the step of applying the agricultural composition of the first aspect of this invention and/or applying the liquid agricultural adjuvant of to the second aspect of this invention and/or applying the tank mix of the third aspect of this invention to plants in need thereof, therein controlling and/or treating *Citrus* greening disease or HLB.

There is further provided for the agricultural composition of the first aspect; the liquid agricultural adjuvant of the second aspect; the tank mix of the third aspect; and/or the method of the fourth aspect, substantially as herein described, illustrated and/or exemplified with reference any one or more of the figures and/or examples herein.

The Applicant has surprisingly found that the aspects according to this invention herein above and herein below at least ameliorate the symptoms of vascular disease in plants, particularly *Citrus* greening disease or HLB in *Citrus* trees. Without being limited to theory, the invention herein described provides for vascular dilation of the vascular system of plants improving sap mobility resulting in improvements in absorption of nutrients and/or anti-pathogenic compounds and/or beneficial compounds providing improved levels of photosynthesis, and/or improved plant health resulting in the amelioration of symptoms of HLB. It is also thought that increased vascular dilation provides more efficient means to deliver a biocide selected from, but not limited to the group comprising: bactericides, fungicides, herbicides, pesticides, miticides, ovicides, insecticides, nematicides and combinations thereof, to the vascular tissue of plants. Additionally, or alternatively, the invention herein described may facilitate degradation of foreign blockages caused by microorganisms (including bacteria and/or fungi), viruses or pests within the vascular system of plants improving sap mobility resulting in improvements in absorption of nutrients and/or medicinal compounds and/or beneficial compounds and/or plant protection products providing improved levels of photosynthesis.

BRIEF DESCRIPTION OF THE FIGURES

The pictures were taken from the central plant of each treatment plot, in exactly the same position, using a permanently fixed support stake for each tree in the trials with the same height to get similar angles. This methodology is used throughout the whole experiment over a period of at least 3 years.

FIG. 1: Picture from Experiment #1—Treatment #1 witness untreated *Citrus* tree—comparing time 0 at Apr. 12, 2017 and time 189 Days After Treatment (D.A.T.) at Oct. 5, 2018.

FIG. 2: Picture from Experiment #1—Treatment #7 treated *Citrus* tree—comparing time 0 at Apr. 12, 2017 and time 189 Days After Treatment (D.A.T.) at Oct. 5, 2018.

FIG. 3: Picture from Experiment #1—Treatment #8 treated *Citrus* tree—comparing time 0 at Apr. 12, 2017 and time 189 Days After Treatment (D.A.T.) at Oct. 5, 2018.

FIG. 4: Picture from Experiment #1—Treatment #9 treated *Citrus* tree—comparing time 0 at Apr. 12, 2017 and time 189 Days After Treatment (D.A.T.) at Oct. 5, 2018.

FIG. 5: Picture from Experiment #1—Treatment #10 treated *Citrus* tree—comparing time 0 at Apr. 12, 2017 and time 189 Days After Treatment (D.A.T.) at Oct. 5, 2018.

FIG. 6 is: Picture from Experiment #2—Treatment #1 witness untreated *Citrus* tree—comparing time 0 at Oct. 5, 2017 and time 116 Days After Treatment (D.A.T.) at Jan. 29, 2018.

Figure 7:

FIG. 7: Picture from Experiment #2—Treatment #11 treated *Citrus* tree—comparing time 0 at Oct. 5, 2017 and time 116 Days After Treatment (D.A.T.) at Jan. 29, 2018.

Figure 8:

FIG. 8: Picture from Experiment #2—Treatment #12 treated *Citrus* tree—comparing time 0 at Oct. 5, 2017 and time 116 Days After Treatment (D.A.T.) at Jan. 29, 2018.

Figure 9:
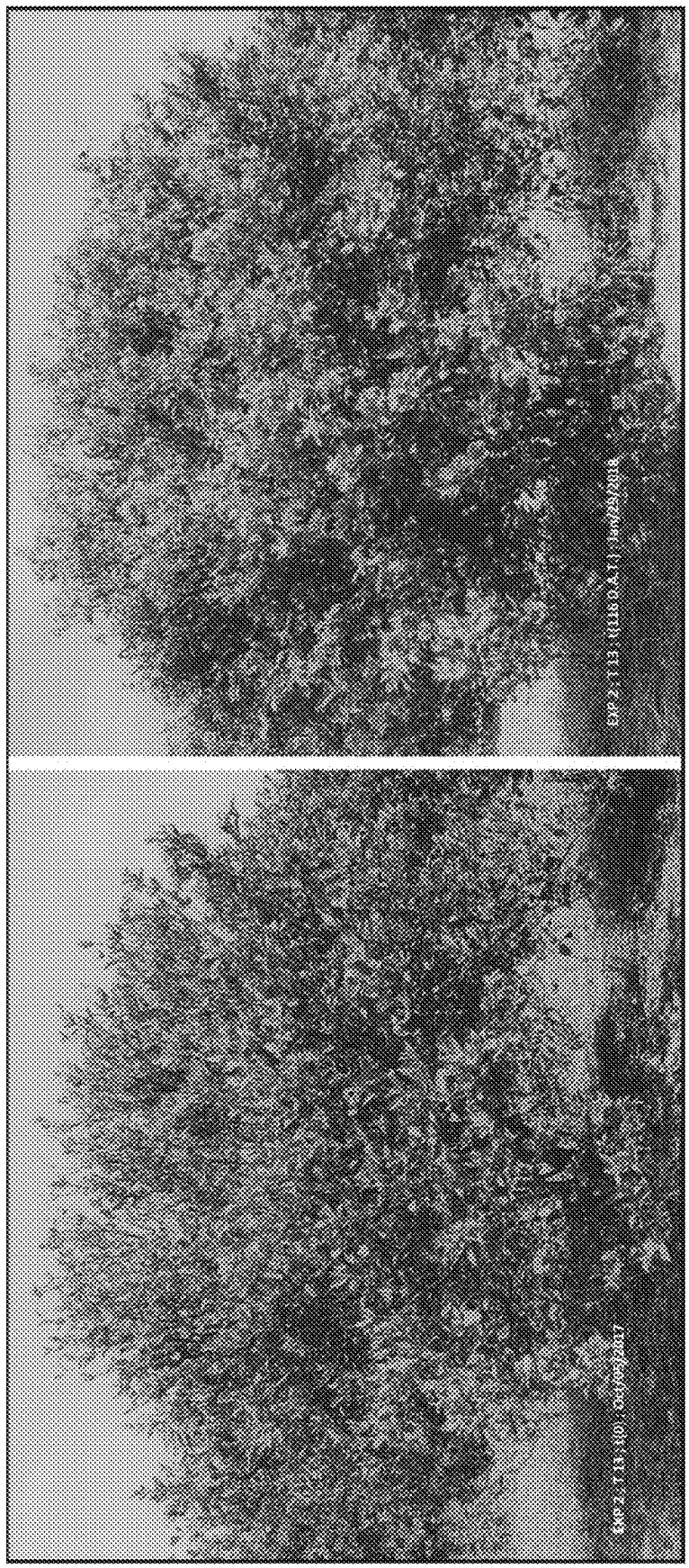

FIG. 9: Picture from Experiment #2—Treatment #13 treated *Citrus* tree—comparing time 0 at Oct. 5, 2017 and time 116 Days After Treatment (D.A.T.) at Jan. 29, 2018.

Figure 10:
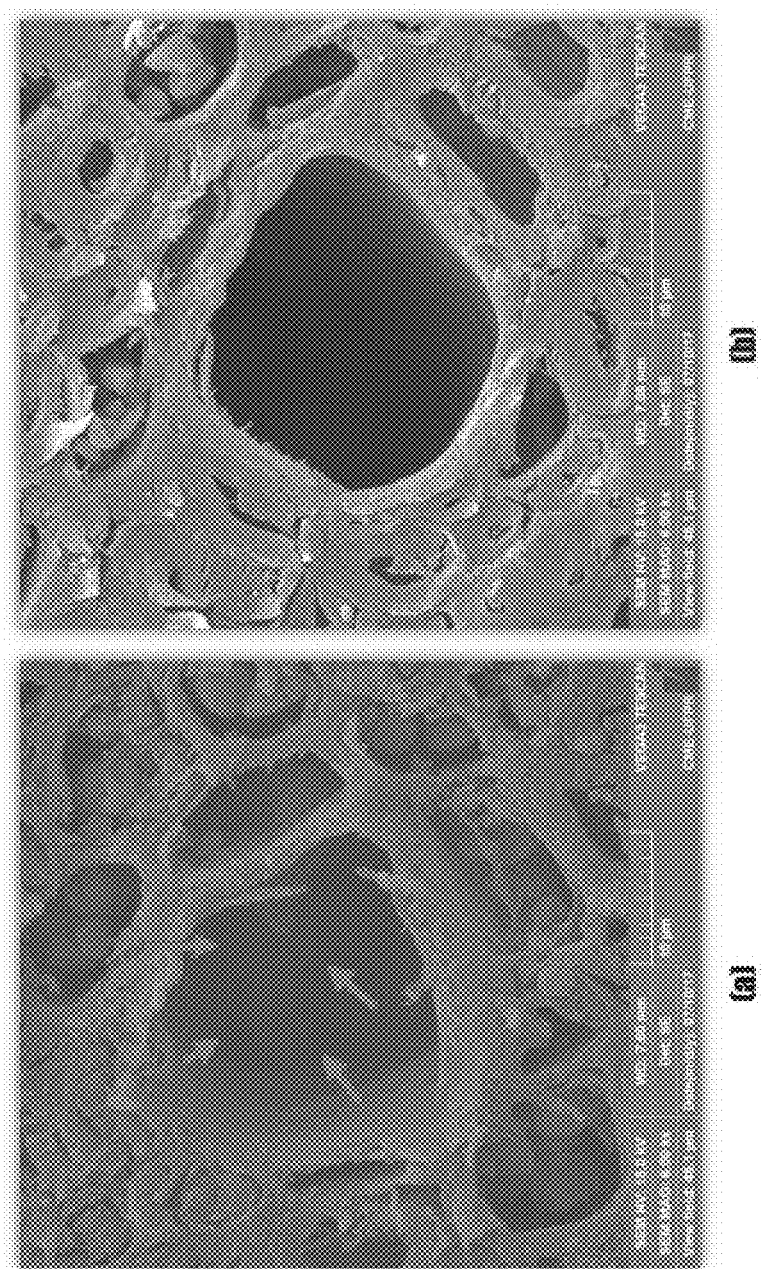

FIG. 10: Electron micrographs through leaves of *Citrus* trees wherein (a) shows a cross section through a *Citrus* plant suffering from HLB and untreated, and wherein (b) shows a cross section through a *Citrus* plant suffering from HLB but having been treated with an agricultural composition in accordance with this invention. (a) shows bacterial blockages in the vascular system and (b) shows amelioration of the bacterial blockages in the vascular system after application of the invention.

DETAILED DESCRIPTION

The content of the Summary is repeated herein by way of reference thereto to avoid repetition. Generally, tannic acid is provided for the control and/or treatment of vascular disease in plants. In a first aspect of the invention there is provided an agricultural composition as set out above. In a second aspect of the invention there is provided a liquid agricultural adjuvant which is stable and as described above. In a third aspect of the invention there is provided a tank mix including the first and second aspects. A fourth aspect is provided as a method of controlling and/or treating vascular disease, preferably *Citrus* greening disease or HLB, in plants.

In a certain embodiment of the second aspect there is provided a stable liquid agricultural adjuvant comprising at least one essential oil high terpene contend, at least one anionic surfactant, at least one nonionic surfactant, and tannic acid. The liquid agricultural adjuvant may further be diluted with water or other solvents, and then tank mixed with fertilizers compositions and/or other chemistries. The liquid agricultural adjuvant containing tannic acid may be added in a tank mix at a ratio from 0.1 to 20.0 kg per hectare or from 0.1 to 20.0 liters per hectare as a treatment for vascular diseases on plants alone or in combination with other chemistries.

The aforementioned treatment via use of the agricultural composition and/or use of the stable liquid agricultural adjuvant and/or use of the tank mix on plants has been shown to be able to contain and/or control and/or to reverse already very serious deterioration of the trees affected by HLB and other diseases that compromise the vascular bundle of plants through a series of foliar spray applications. The aforementioned treatment resulted in vigorous new growth of shoots, roots and fruits.

The disclosure extends to a method of manufacturing the agricultural composition and/or the liquid agricultural adjuvant and/or tank mix, and methods of use, typically within an agricultural field of endeavor. The Applicant has now surprisingly found the agricultural compositions and/or liquid agricultural adjuvants and/or tank mix and/or method described herein at least ameliorates the disadvantages known in the prior art. Without being limited to theory, the invention herein described provides for vascular dilation of the vascular system of plants improving sap mobility resulting in improvements in absorption of nutrients and/or anti-pathogenic compounds and/or beneficial compounds providing improved levels of photosynthesis. Dilation of the vascular tissue also provides for more efficient delivery of biocides to diseased areas of a plant. Moreover, *Citrus* plants suffering from *Citrus* greening disease or HLB show marked signs of improved health. Additionally, or alternatively, the invention herein described may facilitate degradation of foreign blockages caused by microorganisms (including bacteria and/or fungi), viruses or pests within the vascular system of plants improving sap mobility resulting in improvements in absorption of nutrients and/or medicinal compounds and/or beneficial compounds and/or plant protection products providing improved levels of photosynthesis.

Definitions

The term "adjuvant" as used herein is a broad term, and is to be given its ordinary and customary meaning to a person of ordinary skill in the art (and is not to be limited to a special or customized meaning), and refers without limitation to an agent that modifies the effect of other agents and more particularly used to enhance the effectiveness of pesticides such as herbicides, insecticides, fungicides, plant protection products, and other agents.

The term "stable" as used herein is a broad term, combined or related with the term "formulation" and is to be given its ordinary and customary meaning to a person of ordinary skill in the art (and is not to be limited to a special or customized meaning), and refers without limitation to the formulation stability, i.e. the ability of a formulation to resist change in its properties over time, more specifically during the time that the product stays in the market to be sold to the final customers, it does not change significantly its intrinsic characteristics over time, it is thus to be given its ordinary meaning that is customary to a person skilled in the art.

The term "alcohol" as used herein is a broad term, and is to be given its ordinary and customary meaning to a person of ordinary skill in the art (and is not to be limited to a special or customized meaning), and refers without limitation to any compound as described herein incorporating one or more hydroxy groups, or being substituted by or functionalized to include one or more hydroxy groups.

The term "ester" as used herein is a broad term, and is to be given its ordinary and customary meaning to a person of ordinary skill in the art (and is not to be limited to a special or customized meaning), and refers without limitation to any compound as described herein incorporating one or more ester groups, e.g., monoester, diester, triester, or polyester, or being substituted by or functionalized to include one or more ester groups. Esters include but are not limited to fatty acid esters.

The term "glycols" as used herein is a broad term, and is to be given its ordinary and customary meaning to a person of ordinary skill in the art (and is not to be limited to a special or customized meaning), and can include diols, e.g., polyalkylene glycols such as polyethylene glycols (polymers having the formula $H(OCH_2CH_2)_nOH$ where n is greater than three), polypropylene glycols, or glycols incorporating monomers comprising longer hydrocarbon chains.

The term "terpenes" as used herein is a broad term, and is to be given its ordinary and customary meaning to a person of ordinary skill in the art (and is not to be limited to a special or customized meaning), and refers without limitation to any compound as derived from resins of plants such as conifers, or to synthetically produced compounds having the same structures as plant derived terpenes. Terpenes can include hydrocarbons as well as terpenoids containing additional functional groups, as well as essential oils. Terpenes can include compounds having a formula $(C_5H_8)_n$ where n is the number of linked isoprene units (e.g., 1, 2, 3, 4, 5, 6, 7, 8, 9, 10, or more).

The term "terpene containing natural oil" as used herein is a broad term, and is to be given its ordinary and customary meaning to a person of ordinary skill in the art (and is not to be limited to a special or customized meaning), and refers without limitation to a natural oil containing at least 50% of a terpene selected from but not exclusively from the group consisting of orange oil, grapefruit oil, lemon oil, lime oil, tangerine oil, citronella oil, and pine oil or components thereof.

The term "sulfoxides" as used herein is a broad term, and is to be given its ordinary and customary meaning to a person of ordinary skill in the art (and is not to be limited to a special or customized meaning), and refers without limitation to any compound as described herein incorporating one or more sulfinyl (SO) groups, or being substituted by or functionalized to include one or more sulfinyl groups.

Whenever a group is described as being "optionally substituted" that group may be unsubstituted or substituted with one or more of the indicated substituents. Likewise, when a group is described as being "unsubstituted or substituted" if substituted, the substituent(s) may be selected from one or more the indicated substituents. If no substituents are indicated, it is meant that the indicated "optionally substituted" or "substituted" group may be substituted with one or more group(s) individually and independently selected from alkyl, alkenyl, alkynyl, cycloalkyl, cycloalkenyl, cycloalkynyl, aryl, heteroaryl, heteroalicyclyl, aralkyl, heteroaralkyl, (heteroalicyclyl)alkyl, hydroxy, protected hydroxyl, alkoxy, aryloxy, acyl, mercapto, alkylthio, arylthio, cyano, halogen, thiocarbonyl, O-carbamyl, N-carbamyl, O-thiocarbamyl, N-thiocarbamyl, C-amido, N-amido, S-sulfonamido, N-sulfonamido, C-carboxy, protected C-carboxy, O-carboxy, isocyanato, thiocyanato, isothiocyanato, nitro, silyl, sulfenyl, sulfinyl, sulfonyl, haloalkyl, haloalkoxy, trihalomethanesulfonyl, trihalomethanesulfonamido, an amino, a mono-substituted amino and a di-substituted amino group, and protected derivatives thereof.

The term "alkyl" as used herein is a broad term, and is to be given its ordinary and customary meaning to a person of ordinary skill in the art (and is not to be limited to a special or customized meaning), and refers without limitation to a straight chain or branched, acyclic or cyclic, unsaturated or saturated aliphatic hydrocarbon containing 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36 or more carbon atoms, while the term "lower alkyl" has the same meaning as alkyl but contains 1, 2, 3, 4, 5, or 6 carbon atoms. Representative saturated straight chain alkyls include methyl, ethyl, n-propyl, n-butyl, n-pentyl, n-hexyl, and the like; while saturated branched alkyls include isopropyl, sec-butyl, isobutyl, tert-butyl, isopentyl, and the like. Unsaturated alkyls contain at least one double or triple bond between adjacent carbon atoms (referred to as an "alkenyl" or "alkynyl," respectively). Representative straight chain and branched alkenyls include ethylenyl, propylenyl, 1-butenyl, 2-butenyl, isobutylenyl, 1-pentenyl, 2-pentenyl, 3-methyl-1-butenyl, 2-methyl-2-butenyl, 2,3-dimethyl-2-butenyl, and the like; while representative straight chain and branched alkynyls include acetylenyl, propynyl, 1-butynyl, 2-butynyl, 1-pentynyl, 2-pentynyl, 3-methyl-1 butynyl, and the like. Typical alkyl groups include, but are in no way limited to, methyl, ethyl, propyl, isopropyl, butyl, isobutyl, tertiary butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, henatriacontyl, dotriacontyl, tritriacontyl, tetratriacontyl, pentatriacontanyl, and hexatriacontanoic. The alkyl group may be substituted or unsubstituted.

The term "alkoxy" as used herein is a broad term, and is to be given its ordinary and customary meaning to a person of ordinary skill in the art (and is not to be limited to a special or customized meaning), and refers without limitation to an alkyl moiety attached through an oxygen bridge (i.e., —O-alkyl) such as methoxy, ethoxy, and the like.

The term "thioalkyl" as used herein is a broad term, and is to be given its ordinary and customary meaning to a person of ordinary skill in the art (and is not to be limited to a special or customized meaning), and refers without limitation to an alkyl moiety attached through a sulfur bridge (i.e., —S— alkyl) such as methylthio, ethylthio, and the like.

The term "hydrocarbons" as used herein is a broad term, and is to be given its ordinary and customary meaning to a person of ordinary skill in the art (and is not to be limited to a special or customized meaning), and refers without limitation to any compound comprising only carbon and hydrogen atoms. A functionalized or substituted hydrocarbon has one or more substituents as described elsewhere herein.

The term "anhydrides" as used herein is a broad term, and is to be given its ordinary and customary meaning to a person of ordinary skill in the art (and is not to be limited to a special or customized meaning), and refers without limitation to any compound as described herein incorporating one or more anhydride groups (of formula $(RC(O))_2O$), or being substituted by or functionalized to include one or more anhydride groups.

The term "sulfonic acid" as used herein is a broad term, and is to be given its ordinary and customary meaning to a person of ordinary skill in the art (and is not to be limited to a special or customized meaning), and refers without limitation to, for example formic, acetic, succinic, lactic, malic, tartaric, citric, ascorbic, nicotinic, methanesulfonic, ethanesulfonic, p-toluensulfonic, salicylic or naphthalene sulfonic acid. Sulfonic acids can include hydrocarbyl sulfonic acids, such as aryl sulfonic acids, alkyl benzene sulfonic acid, among other.

The term "vegetable oil" as used herein is a broad term, and is to be given its ordinary and customary meaning to a person of ordinary skill in the art (and is not to be limited to a special or customized meaning), and refers without limitation to oleaginous fatty acid constituents of vegetable matter, e.g., saturated fatty acids, monounsaturated fatty acids, polyunsaturated fatty acids, etc. The vegetable oil can be functionalized, e.g., alkoxylated, hydroxylated, aminated, etc. A functionalized vegetable oil is a derivative of a vegetable oil or other fatty substance, or a substance having a similar composition regardless of the origin of the substance. In some embodiments, the functionalized vegetable oil is epoxidized unsaturated triglyceride. Epoxidized unsaturated triglyceride is a tri-ester of glycerine. The glycerine bonds to three linear or branched carboxylic acids, wherein at least one of the carboxylic acids comprises an epoxide moiety. For example, the epoxidized unsaturated triglyceride may be a derivative of an unsaturated fatty acid triglyceride such as a vegetable or animal fat or oil, wherein at least one of the C=C moieties of the parent unsaturated fatty acid triglyceride is replaced with an epoxide moiety (i.e. a three-membered ring containing an oxygen). If the parent unsaturated fatty acid triglyceride has more than one C=C moiety, one, part, or all of the C=C moieties may be replaced by epoxide moieties. When the term "vegetable oil" is used herein, it is understood to include animal fats, or oils of synthetic origin, having a same chemical structure as a vegetable oil. Examples of vegetable or animal fats or oils include coconut oil, corn oil, cottonseed oil, olive oil, palm oil, peanut oil, rapeseed oil, canola oil, safflower oil, sesame oil, soybean oil, sunflower oil, castor oil, tallow oil, or the like.

As used herein, the abbreviations for any compound, is, unless indicated otherwise, in accord with its common usage, recognized abbreviations, or the IUPAC-IUB Commission on Biochemical Nomenclature (See, Biochem. 11:942-944 (1972)).

Any percentages, ratios or other quantities referred to herein are on a weight basis, unless otherwise indicated.

The cyclic systems referred to herein include fused ring, bridged ring, and spiro ring moieties, in addition to isolated monocyclic moieties.

EXAMPLES

The examples here below are not to be considered as limiting to the invention. The broad disclosures made in the Summary and Detailed Description herein above are repeated by way of reference.

Examples of Products According the Present Invention

Method of Preparing the Liquid Agricultural Adjuvant Concentrate

For the purpose of illustration, the method for preparing the liquid agricultural adjuvant composition (in its concentrate form) as used in the non-limiting examples, includes the following steps: (i) admixing into a vessel with a portion of water and/or oil, (ii) adding at least one anionic surfactant such as a sodium lauryl ether sulfate, (iii) adding at least one nonionic surfactant such a fatty alcohol ethoxylated, and (iv) adding at least one essential oil high terpene contend such as a cold pressed orange oil; (v) adding tannic acid in a concentrate solid form or in a liquid diluted form. The method may optionally include an additional further step (vi) adding at least one additive such as, but not limited to, a preservative, an antioxidant, a stabilizer, for examples. Typically, the steps above are conducted in sequence from step (i) to step (v) and further the optional step (vi). The admixture is continuously stirred. Heating is not necessarily required but may advantageously be employed depending on the physical state of each compound. For certain components, lower temperatures or higher temperatures may be employed. The temperature can be selected so as to facilitate mixing within a desired time period, while avoiding degradation or undesired reaction of the components. Other additives can also be added for specific purposes, such as, but not limited to, clarifiers, anti-foaming agents, anti-freezing agents, hydrotropes, UV stabilizers, colorants, nutrients, amino-acids, sea extract, anti-drift agents, anti-freezing agents, and water, oil or other solvents and combinations thereof. Finally, a number of anti-pathogenic agents and/or biocides may be added.

The liquid agricultural adjuvant composition may comprise various ratios of components, typically the agricultural adjuvant composition, in its concentrated liquid form, comprises from about 0.1 wt. % to about 20 wt. % of the at least one essential oil high terpene contend; and from about 0.1 wt. % to about 25 wt. % of tannic acid; and from about 1 wt. % to about 50 wt. % of the at least one anionic surfactant, and from about 1 wt. % to about 50 wt. % of the at least one nonionic surfactant, and from about 2 wt. % to about 80 wt. % of the water and/or other additives.

Specifically, the liquid concentrate agricultural composition (in its concentrated liquid form), comprises from 1 to 20 wt. % of the at least one essential oil high terpene contend—preferably between to 2 to 10 wt. % by weight; the tannic acid comprises from 1 to 25 wt. %—preferably between 0.1 to 10 wt. % by weight; the at least one anionic surfactant comprises from 1 to 30 wt. % by weight—preferably from 3 to 20% by weight; the at least one nonionic surfactant from 1 to 40 wt. % by weight—preferably from 5 to 30 wt. % by weight; and wherein the water, oils or other additives are from 20 to 70 wt. % by weight—preferably from 30 to 65 wt. % by weight. In other words, where the liquid concentrate agricultural adjuvant composition has a weight of 100 g it comprises 1 to 20 g of the at least one essential oil high terpene contend—preferably between to 2 to 10 g; the tannic acid comprises from 0.1 to 25 g—preferably from 0.1 to 10 g; the at least one anionic surfactant comprises from 1 to 30 g—preferably from 3 to 20 g; the at least one nonionic surfactant from 1 to 40 g—preferably from 5 to 30 g; and wherein the water, oils or other additives are from 20 to 70 g—preferably from 30 to 65 g. Any percentages, ratios or other quantities referred to herein are on a weight basis in grams, unless otherwise indicated.

Preparing the Liquid Concentrate Agricultural Adjuvant Compositions According to this Invention Two different liquid concentrate agricultural adjuvant compositions (in concentrate form), were prepared according to some of the embodiments of this disclosure. The concentrates agricultural adjuvant compositions are indicated by Example 1 (OR-345) and example 2 (OR-346). The details of the specific embodiments are shown in Table 1. Various components were employed in the different formulations, including cold pressed orange oil—natural essential oil; polyoxyethylene sorbitan monolaurate—anionic surfactant; alcohol ethoxylated POE-6—nonionic surfactant; sodium dodecyl benzene sulfonate—anionic surfactant; sodium lauryl ether sulfate—anionic surfactant; alcohol ethoxylated and propoxylated EOPO 6/9—nonionic surfactant; Tannic acid powder.

TABLE 1

Liquid agricultural adjuvant concentrates made according the present invention

| Compound | Example 1 (OR-345) Amount (weight/weight %) | Example 2 (OR-346) Amount (weight/weight %) |
| --- | --- | --- |
| Natural essential oil | 3.00 | 4.00 |
| Tannic acid powder | 4.00 | 5.00 |
| Alcohol Ethoxylated 6 POE | 8.00 | 12.00 |
| Sodium Alkyl Benzene Sulfonate | 12.00 | 11.00 |
| Sodium lauryl ether sulfate | 14.00 | 7.00 |
| Other additives | 5.00 | 5.00 |
| Water | 64.00 | 66.00 |
| TOTAL (weight/weight %) | 100.0 | 1.000 |

Physical Chemical and Accelerated Stability Tests

Samples of products of certain embodiments of the invention were analyzed to determine their physical chemical characteristics and their behavior when diluted in water—pH, viscosity, emulsion stability, using methodology described on CIPAC Handbook F—collaborative international pesticide analytical Ltd, 1994, reprint in 2007, the contents of which are hereby incorporated by reference in their entirety. It was determined to the products prepared according to the invention the accelerated storage stability and all samples were stable even in cold or warm conditions.

TABLE 2

Physico-chemical properties and accelerated stability test results-compositions made in accordance with this invention

| ANALYSIS | OR-345 | OR-346 |
|---|---|---|
| Appearance (product) | Black Liquid | Black Liquid |
| Formulation type | Microemulsion (ME) | Microemulsion (ME) |
| Density @ 20° C. | 1.041 | 1.038 |
| pH (product) | 7.34 | 7.47 |
| pH (1% v/v) | — | — |
| Viscosity @ 25° C. | 310 Cp | 270 Cp |
| Appearance (solution at 1.0%-distilled water) | Clear | Clear |
| Emulsion Stability (CIPAC MT 36) 1% v/v 2 hours @ 30° C. Water CIPAC A and D | No cream and No Oil | No cream and No Oil |
| Emulsion Stability Method CIPAC MT 36 1% v/v 24 h 30 hours re-emulsified at 30° C. Water CIPAC A and D | No cream and No Oil | No cream and No Oil |
| Accelerated Storage Procedure Method CIPAC MT 46 (14 days at 0°, 20° and 54° C.) | Stable | Stable |

Method of Preparing the Agricultural Composition According to the Invention as a Preferred Embodiment Namely, a Liquid Fertilizer Composition Concentrate For the purpose of illustration, the method for preparing the liquid fertilizer concentrate as used in the non-limiting examples is by: (i) admixing water or other solvent such as alcohol or glycol; (ii) adding a component fertilizer such as a salt, acid, or other source of a nutrient and stirring the mixture while keeping the temperature between 10 to 50° C.; (iii) adding tannic acid in a concentrate solid form or in a liquid diluted form. The method may optionally include an additional further step (iv) adding at least one additive such as, but not limited to, a preservative, a stabilizer, for examples. Typically, the steps above are conducted in sequence from step (i) to step (iii) and further the optional step (iv). The admixture is continuously stirred. Heating is not necessary. For certain components, lower temperatures or higher temperatures can occur according to the physical state of compound and its enthalpy. The temperature can be selected so as to facilitate mixing within a desired time period, while avoiding degradation or undesired reaction of the components. The addiction of the tannic acid in a solid form is better to be done in small portions to get a better and fast dissolution. Other additives can also be added for specific purposes, such as, but not limited to, anionic dispersants, cationic dispersants, nonionic dispersants, monomeric dispersants, polymeric dispersants, acrylic dispersants, naphthalenic dispersant, anionic humectants, cationic humectants, nonionic humectants, naphthalenic humectants, rheological modifiers, preservatives, antifoams, anti-freezings, stabilizers, hydrotopes, stimulants, biologicals, growth agents, amino-acids, hormones, solvents or co-solvents, nutrients, and even water, oil or other solvents and combinations thereof. Finally, any one of a number of anti-pathogenic agents and/or biocides may be added.

Examples of liquid fertilizer compositions according to the current invention comprise formulation of liquid solutions or concentrate suspensions. Other process and equipment can be used to produce the liquid, fluid or gel fertilizer as wet milling, chelating, complexing, solubilization, crystallization, jellification, among other.

Method of Preparing the Agricultural Composition According to the Invention as a Preferred Embodiment Namely, a Solid Fertilizer Composition Concentrate For the purpose of illustration, the method for preparing the solid fertilizer compositions concentrate as used in the non-limiting examples is by: (i) admixing in a ribbon blender a fertilizer component such as a salt, acid, or other source of a fertilizer nutrient; (ii) adding a dispersant agent, (iii) or adding a humectant agent, (iv) or adding an anti-caking agent; (v) adding powder or liquid solution of tannic acid; (vi) blending the mixture while keeping the temperature between 25 to 40° C. Heating is necessary if humidity need to be controlled. For certain components, lower temperatures or higher temperatures can occur according the type of compound and its enthalpy. The temperature can be selected so as to facilitate blending within a desired time period, while avoiding degradation or undesired caking of the components. The addiction of the tannic acid in a solid form is better to be done in small portions to get a better and faster mixture. Other additives can also be added for specific purposes, such as, but not limited to, anionic dispersants, cationic dispersants, nonionic dispersants, monomeric dispersants, polymeric dispersants, acrylic dispersants, naphthalenic dispersant, anionic humectants, cationic humectants, nonionic humectants, naphthalenic humectants, rheological modifiers, preservatives, antifoams, anti-caking, binders, coating agents, disintegrating agents, fillers, flow agents, stabilizers, hydrotopes, stimulants, biologicals, growth agents, amino-acids, hormones, solvents or co-solvents, nutrients, and even water. Finally, any one of a number of anti-pathogenic agents and/or biocides may be added.

Examples of solid fertilizer compositions according to the current invention comprise formulation of soluble powder. Other process and equipment can be used to produce the solid fertilizers compositions such as mixers, crushers, blenders, V mixers, rotary drums mixers, fluid beds, granulators, spherodisers, extruders, spray driers, dryers, grinders, air mills, hammer mills, roller mills, ball mills, bead mills, liquid bead mills, coating machines, among other.

Preparing the Agricultural Compositions as Fertilizers Compositions

Various formulations of fertilizer compositions containing tannic acid were produced to illustrate several of the embodiments falling within the ambit of this invention. Various components were employed in the various compositions, including urea technical—urea (45% of nitrogen); tannic acid—tannic acid (min. 70% of tannic acid); tannic acid solution—tannic acid 33% in water; potassium carbonate—(66% of K2O); EDTA 2-disod—EDTA disodium; copper EDTA—copper EDTA chelate (14% of copper); micronized manganese carbonate 325 mesh—(43% of manganese); micronized calcium carbonate—(40% of calcium); phosphoric acid—(61.6% of P2O5); boric acid—(19% of boron); sodium hydroxide solution—(50% of sodium hydroxide)—neutralizing agent; propylene glycol—anti-freezing and humectant; xantham gum 230—rheological modifier; fatty alcohol ethoxylated—nonionic humectant; alkylated sulfonate—anionic humectant and dispersant; graft co-polymer—polymeric dispersant; naphthalene sulfonate condensate—naphthalenic dispersant; lignosulfonate—anionic dispersant; alkylated sulfonate—anionic humectant; benzoisotiazolinones—preservative.

Examples 3 to 6—Primary and Secondary Nutrients Compositions—Nitrogen (N), Phosphorous (P), Potassium (K), Calcium (Ca), Magnesium (Mg) and Sulfur (S)

Example 3—A liquid fertilizer compositions containing nitrogen, boron and tannic acid according to the current invention comprising: 6.8% of Technical Urea, 1.2% of Boric Acid, 10.0% of tannic acid solution 33%, 6.0% of nonionic humectant; 10.0% of anionic humectant and dispersant; 66.0% of water and other additives. The final fertilizer composition guarantees are 3.0% of Nitrogen, 0.2% of boron.

Example 4—A liquid fertilizer compositions containing potassium and tannic acid according to the current invention comprising: 38.0% of potassium carbonate, 9.0% of Tannic Acid solution 33%, 4.0% of anti-freezing and humectant; 54.0% of water, preservatives, xantham gum and other additives. The final fertilizer composition guarantees are 25% of Potassium (as K2O).

Example 5—A liquid fertilizer compositions containing calcium and tannic acid according to the current invention comprising: 52% of micronized calcium carbonate 325 mesh, 8.0% of tannic acid solution 33%, 8.0% polymeric dispersant, 5.0% of Anti-freezing; 27% of water and other additives. The final fertilizer composition guarantees are 15.0% of calcium.

Example 6—A liquid fertilizer compositions containing sulfur and tannic acid according to the current invention comprising: 42.0% of micronized elemental Sulfur 325 mesh, 8.0% of tannic acid solution 33%, 3.0% polymeric dispersant, 5.0% of anti-freezing; 2% anionic dispersant, 40.0% of water and other additives. The final fertilizer composition guarantees are 40.0% of Sulfur.

Examples 7 to 10—Micronutrients Compositions—Boron (B), Copper (Cu), Manganese (Mn), and Zinc (Zn)

Example 7—A liquid fertilizer compositions containing boron and tannic acid according to the current invention comprising: 44.0% of boric acid, 12.0% of monoethanolamine, 10.0% of tannic acid solution 33%; 34.0% of water and other additives. The final fertilizer composition guarantees are 8% of boron (B).

Example 8—A liquid fertilizer compositions containing boron and tannic acid according to the current invention comprising: 44.0% of boric acid, 9.0% of sodium hydroxide solution 50%, 10.0% of tannic acid solution 33%; 37.0% of water and other additives. The final fertilizer composition guarantees are 8% of boron (B).

Example 9—A solid fertilizer compositions containing copper according to the current invention comprising: 87% of copper chelate; 6% of tannic acid; 4.0% anionic dispersant; 3% of other additives. The final fertilizer composition guarantees are 12.0% of Copper (Cu).

Example 10—A liquid fertilizer compositions containing manganese and tannic acid according to the current invention comprising: 35.0% of micronized manganese carbonate 325 mesh; 8.0% of tannic acid solution 33%; 5.0% of anti-freezing and humectant; 5.0% of polymeric dispersant; 47.0% of water, preservatives, xanthan gum and other additives. The final fertilizer composition guarantees are 15.0% of manganese (Mn).

Fertilizer Composition Used in Field Trials Boron (B)—OR-198

OR-198—A liquid fertilizer compositions containing boron and tannic acid according to the current invention comprising: 44.0% of boric acid; 12.0% of Monoethanolamine; 43.0% of water and other additives. The final fertilizer composition guarantees are 8% of boron (B).

Fungicides Compositions Used in Field Trials—Copper Oxychloride and Sulphur

OR-210—A liquid fertilizer suspension concentrate (SC) composition containing copper oxychloride comprising: 26.0% of copper oxychloride; 4.0% naphthalenic dispersant; 2.0% of polymeric dispersant; 5.0% of other additives such as anti-freezing agent, humectant agent, thickening agent, preservative and around 63% of water. The final fungicide composition guarantees are 260 g/L of Copper Oxychloride.

OR-161-B-3-A—A liquid fertilizer suspension concentrate (SC) composition containing elemental sulphur comprising: 46.0% of elemental sulphur; 3.0% naphthalenic dispersant; 3.0% polymeric dispersant; 5.0% of other additives such as anti-freezing agent, humectant agent, thickening agent, preservative and around 43% of water. The final fungicide composition guarantees are 575 g/L of Sulphur.

Physical Chemical and Accelerated Stability Tests

Samples of products of certain embodiments of the invention were analyzed to determine their physical chemical characteristics and their behavior when diluted in water—pH, viscosity, particle size distribution and suspensibility, using methodology described on CIPAC Handbook F—collaborative international pesticide analytical Ltd, 1994, reprint in 2007, the contents of which are hereby incorporated by reference in their entirety. It was determined to the products prepared according to the invention the accelerated storage stability and all samples were stable even in cold or warm conditions.

TABLE 3

Compositions of fertilizers containing primary and secondary nutrients and tannic acid according to the invention-Physical and Chemical and Accelerated Stability Tests results

| ANALYSIS | Example 3 | Example 4 | Example 5 | Example 6 |
|---|---|---|---|---|
| Appearance (product) | Brown liquid | Off white liquid | Off white liquid | Yellow liquid |
| Formulation type | Concentrate Soluble (CS) | Concentrate Soluble (CS) | Suspension Concentrate (SC) | Suspension Concentrate (SC) |
| Density @ 20° C. (g/ccm) | 1.070 | 1.375 | 1.410 | 1.38 |
| pH (product) | 6.90 | 7.36 | 7.70 | 6.90 |
| pH (1% v/v) | 6.78 | 7.55 | 7.94 | 6.70 |
| Viscosity @ 25° C. (cP) Method CIPAC MT 192 | 120 | 350 | 1500 | 3.100 |
| Particle size distribution (d50-micra) | — | — | 1.74 | 1.39 |

TABLE 3-continued

Compositions of fertilizers containing primary and secondary nutrients and tannic acid according to the invention-Physical and Chemical and Accelerated Stability Tests results

| ANALYSIS | Example 3 | Example 4 | Example 5 | Example 6 |
|---|---|---|---|---|
| Suspensibility @ 30° C. CIPAC A water (% w/w) Method CIPAC MT 161 | — | — | 99.6 | 99.5 |
| Guarantees-Nutrients (% w/w) | (N): 3.1% (B): 0.22% | (K2O): 25.7% | (Ca): 15.9% | (S): 41.1% |
| Appearance (solution at 0.5%-distillated water) | Limpid brown liquid | Limpid brown liquid | Turbid off white liquid | Turbid yellow liquid |
| Accelerated Storage Procedure Method CIPAC MT 46 (14 days at 5, 20 and 54° C.) | Stable | Stable | Stable | Stable |

TABLE 4

Micronutrients compositions according to the invention-Physical and Chemical and Accelerated Stability Tests results

| ANALYSIS | Example 7 (OR-198-A) | Example 8 (OR-198-B) | Example 9 | Example 10 |
|---|---|---|---|---|
| Appearance (product) | Brown liquid | Brown liquid | Blue Powder | Brown liquid |
| Formulation type | Concentrate Soluble (CS) | Concentrate Soluble (CS) | Water Soluble Powder (WP) | Suspension Concentrate (SC) |
| Density @ 20° C. | 1.282 | 1.290 | 2.12 | 1.384 |
| pH (product) | 6.10 | 6.22 | 6.80 | 7.80 |
| pH (1% v/v) | 6.01 | 6.18 | 6.70 | 7.70 |
| Viscosity @ 25° C. (cP) | 150 | 200 | 110 | 2600 |
| Particle size distribution (d50-micra) | — | — | — | 1.84 |
| Suspensibility @ 30° C. CIPAC A water (% w/w) Method CIPAC MT 161 | — | — | — | 99.2 |
| Appearance (solution at 0.5%-distillated water) | Limpid brown liquid | Limpid brown liquid | Limpid blue liquid | Turbid brown liquid |
| Guarantees-Nutrients (% w/w) | (B): 8.1% | (B): 8.0% | (Cu): 12.1% | (Mn): 16.2% |
| Accelerated Storage Procedure Method CIPAC MT 46 (14 days at 5, 20 and 54° C.) | Stable | Stable | Stable | Stable |

Although the invention has been described in some detail by way of illustrations and examples for purposes of clarity and understanding, it is apparent to those skilled in the art that certain changes and modifications may be practiced. Therefore, the description and examples should not be construed as limiting the scope of the invention to the specific embodiments and examples described herein, but rather to also cover all modification and alternatives coming with the true scope and spirit of the invention.

Field Trial and Lab Trials—Recovery Evaluation Methodology

Field trials were conducted over 3 years in 2 locations in Brazil to evaluate and finally to prove that the compositions and methods of treatments for improving plant health and keeping under control phytopathogenic bacteria and endophytic microorganisms in a plant, for example, *Candidatus Liberibacter* in *Citrus* plants by applying a bundle that consists in a fertilizer solution of one or more nutrients added with a portion of tannic acid in solution that promotes a vascular dilation of plant tissues and/or promotes the unclogging of bacterial colonies from the vascular plant tissue, resulting in a recovery of the levels of photosynthesis of the treated trees, their fruits and the health of the plants.

The objectives of these studies were to evaluate and measure the recovery of Huanglongbing (HLB) symptoms, a disease caused by the colonization of *Candidatus liberibacter* in the phloem and xylem vessels, after spraying different formulations of the current invention and its mixture with other formulations. At the end the formulation elected—OR-198-A—showed surprisingly results. Field trials will be carried on until 1,095 days after the treatments (3 years after initiate the treatments).

Codes and Products Used During the Field Trials:
a) OR-198-A—Example 7 of current invention—Fertilizer based on Monoethanolamine borate—Boron 8.0% w/w—containing Tannic acid;
b) OR-198-B—Example 8 of current invention—Fertilizer based on Sodium borate—Boron 8.0% w/w—containing Tannic acid;
e) OR-345—Example 1 of current invention—Adjuvant based on Essential Oil and Tannic acid;
f) OR-210—Fungicide based on Copper Oxychloride 260.0 g/L;
g) OR-161-B-3-A—Fungicide based on Sulfur 585.00 g/L;
h) WETCIT®—Commercial adjuvant based on Orange Oil and Alcohol ethoxylate;
f) OR-198—Commercial Fertilizer based on Monoethanolamine borate—Boron 8% w/w.

Location: the trial was carried out in 2017 and 2018, in Arapongas, Parana, Brazil, located under the geographic coordinate system: latitude: −23,4164769, longitude: −51, 5126852, Agrobis Farm, plot 91 A. *Citrus* variety was "Pera Rio", 10 years old. The analysis of the nutrients in the soil where both trials were conduct are described in table 5.

TABLE 5

Analysis of the soil (level of nutrients and physical analysis), Arapongas, Paraná, Brazil - 2018.

| P mg · dm$^{-3}$ | O•M g · dm$^{-3}$ | pH CaCl$_2$ | H + Al | Al | K | Ca | Mg | SB | CTC | V % | Al | Sand | Clay | Silt |
|---|---|---|---|---|---|---|---|---|---|---|---|---|---|---|
| | | | | | \multicolumn{5}{c}{cmolc · dm$^{-3}$} | | | \multicolumn{3}{c}{g · Kg$^{-1}$} | | |
| 1.64 | 1.55 | 4.46 | 5.98 | 0.24 | 0.4 | 5 | 1.56 | 6.96 | 7.2 | 53.79 | — | 321 | 612 | 105 |

Experimental design and plots: two trials were carried out on the same farm, the experimental design chose was the Random Block Design. The first trial consisted of 10 treatments and the second 13 treatments, both with 4 replicates. The plot size was formed by one row with 5 plants each, evaluating only the plot center and letting the rest of the plants as a physical barrier to reduce the risk of contamination by other treatments. For the first trial a total of 200 Citrus plants were used and 260 for the second trial.

Spray application: the spray application was carried out with a Back Pack Sprayer (model: Stihl SR 450), using a water volume of 1200 L·ha-1 to match with the practices used by the Citrus grower.

Treatment table: the treatments used in both trials as well as the date and growth stages when the treatments were done are described in table 7. The Spray application interval was 15 days, with 6 sprays application in total for both trials. All treatments used the commercial penetrant adjuvant WETCIT® at a rate of 500 mL c·p·ha$^{-1}$.

Evaluations: photosynthesis, transpiration, fruit diameter, fruit weight, juice content and Brix were evaluated in the two trials. For photosynthesis and transpiration, 4 evaluations were performed in each trial and fruit diameter and weight only one evaluation in all replicates.

To measure photosynthesis, a device called "miniPPM" was used and the data set collected was computed and submitted to calculations to establish the estimated value of the photosynthetic rate based on the formula: $P = Q \times \Phi p \times PAR$, resulting in micromol/m2/s. Assessments just before dawn were also performed in order to establish the "Fref" value to calculate the "Q" factor.

For measurement of transpiration the equipment called "Porometer" was used in the trials, and for each evaluation the equipment was calibrated according to the manufacturer's standards.

Assessments of fruit set were established by counting the total fruit per tree in each plot. After harvesting the plots, a sample of 12 fruits was collected from the harvested fruits and then the measurements of weight and fruit size were performed.

Juice content and Brix were determinate during harvesting time when the fruits were at the ripening stage by extracting its content from 12 fruits in each plot harvested randomly. Brix were determined using a refractometer.

PCR (Polymerase Chain Reaction) tests were also carried out in order to evaluate and confirm the presence of the bacterium Candidatus liberibacter in plants treated and non-treated with the products.

Statistical analysis: the data set obtained in both trials were submitted to the study of homogeneity of variance (to stabilize or reduce the existing variability) through the Box-Cox method. As the data did not present a normal distribution, they were submitted to the transformation following the logarithmic model. The data set was then submitted to analysis of variance, and the means were compared when significant by the Tukey test at 5% probability level. The SASM-Agri program was used to analyze the data set.

Experiment #1

Photosynthesis ($\mu mol/m^2/s$)

Observing the data presented in Table 6, it is noticed that the values for photosynthetic rate ($\mu mol/m^2/s$) before a first spray of the treatments established for the trial are equal by the statistical analysis, which shows that the plants, plots and blocks were uniform in the photosynthesis parameter. Initial evaluation was carried out on 25 Aug. 2017.

After 10 days after the first spray, which was performed on 4 Sep. 2017, it was still possible to observe the homogeneity of the treatments based on the statistical analysis, which allows one to infer that there was still no relevant difference in this parameter to consider that any of the treatments were efficient enough.

However, at 41 days after the first spray, evaluation carried out on 5 Oct. 2017, the treatments showed significant differences, mainly in relation to the control (plot where no spray was employed). It is observed that the significant differences show the most efficient treatments to be OR-198-A (1000 mL·ha−1), and mixtures of either OR-198-A+OR-210 or OR-198-A+OR-161-B-3-A. When the mixture of OR-198-A+OR-161-B-3-A is used, it is possible to observe a trend of better results when the rate factor of OR-198-A is isolated.

For the evaluation at 75 days after the first spray, significant means were also observed for the increase of the photosynthetic rate, and there is an improvement in this parameter, mainly when using the mixture of OR-198-A+OR-161-B-3-A.

TABLE 6

Photosynthesis rate measured during the progress of Experiment (trial) #1. Arapongas, Paraná, Brasil, 2017/2018.

| Treatments** (Product code) | Rate (mL c. p. ha$^{-1}$) | Photosynthesis ($\mu mol/m^2/s$)* | | | |
|---|---|---|---|---|---|
| | | Preview (08/25/17) | 10 D.A.1$^{st}$A. (09/04/17) | 41 D.A.1$^{st}$A. (10/05/17) | 75 D.A.1$^{st}$A. (11/08/17) |
| 1. Untreated plot | — | 46.1 a | 41.5 A | 57.2 b | 34.5 D |
| 2. OR-198-A | 1000 | 48.7 a | 53.0 A | 116.1 a | 85.5 Abcd |
| 3. OR-198-A | 2000 | 49.5 a | 40.1 A | 77.2 ab | 82.9 Bcd |
| 4. OR-198-A | 3000 | 44.3 a | 30.8 A | 73.0 ab | 43.1 Cd |
| 5. OR-198-A + OR-210 | 1000 + 1500 | 44.1 a | 55.9 A | 138.6 a | 116.7 Abc |
| 6. OR-198-A + OR-210 | 2000 + 1500 | 46.4 a | 41.7 A | 92.4 a | 70.8 Abcd |
| 7. OR-198-A + OR-210 | 3000 + 1500 | 55.2 a | 29.6 A | 71.5 ab | 85.8 Abcd |
| 8. OR-198-A + OR-161-B-3-A | 1000 + 2000 | 46.9 a | 65.3 A | 152.5 a | 197.3 Ab |
| 9. OR-198-A + OR-161-B-3-A | 2000 + 2000 | 48.6 a | 53.8 A | 164.6 a | 211.9 A |
| 10. OR-198-A + OR-161-B-3-A | 3000 + 2000 | 51.6 a | 62.1 A | 147.2 a | 160.8 Ab |
| C.V. (%) | | 13.67 | 14.92 | 8.41 | 9.75 |
| Growth stages-BBCH Scale | | 51 | 56 | 67 | 71 |

* means followed by the same letter in the column do not differ statistically at 5% of probability by Tukey test.
** All treatments used Wetcit ® at a rate of 500 mL c.p.ha$^{-1}$ Transpiration (mol/m$^2$/s)

Table 7 shows the means for transpiration of the *Citrus* leaves measured in the field before the beginning of the sprays and after the spray sequence.

It is observed that the means in the initial evaluation conducted on 25 Aug. 2017 were statistically equal, evidencing the homogeneity of the plots in which the treatments were set up.

The treatments resulted in a trend to increase in transpiration, particularly with OR-198-A+OR-161-B-3-A.

TABLE 7

Transpiration (TR) measured during the progress of Experiment (trial) #1. Arapongas, Paraná, Brasil, 2017/2018.

| Treatments** (Product code) | Rate (mL c.p. ha$^{-1}$) | Transpiration (mol/m$^2$/s)* | | | | | | | |
|---|---|---|---|---|---|---|---|---|---|
| | | Preview (Aug. 25, 2017) | | 10 D.A. 1$^{st}$A. (Sep. 4, 2017) | | 41 D.A. 1$^{st}$A. (Oct. 5, 2017) | | 75 D.A. 1$^{st}$A. (Nov. 8, 2017) | |
| | | TR | °C | TR | °C | TR | °C | TR | °C |
| 1. Untreated plot | — | 103.1 | 31.1 A | 164.1 | 29.7 a | 96.2 | 28.9 A | 172.4 | 31.1 A |
| 2. OR-198-A | 1000 | 108.5 | 31.3 A | 195.6 | 29.9 a | 114.6 | 29.1 A | 192.2 | 31.4 A |
| 3. OR-198-A | 2000 | 100.6 | 31.4 A | 189.9 | 29.7 a | 125.4 | 29.2 A | 172.0 | 31.5 A |
| 4. OR-198-A | 3000 | 98.5 | 31.5 A | 197.6 | 29.6 a | 105.3 | 29.9 A | 170.4 | 31.5 A |
| 5. OR-198-A + OR-210 | 1000 + 1500 | 96.4 | 33.0 A | 190.2 | 29.8 a | 143.7 | 29.3 A | 195.0 | 31.9 A |
| 6. OR-198-A + OR-210 | 2000 + 1500 | 98.8 | 32.8 A | 199.8 | 29.5 a | 132.7 | 29.9 A | 192.2 | 31.9 A |
| 7. OR-198-A + OR-210 | 3000 + 1500 | 105.1 | 32.4 A | 185.8 | 29.4 a | 117.1 | 29.1 A | 198.2 | 32.1 A |
| 8. OR-198-A + OR-161-B-3-A | 1000 + 2000 | 103.1 | 33.9 A | 201.6 | 29.3 a | 191.0 | 29.5 A | 248.9 | 31.2 A |
| 9. OR-198-A + OR-161-B-3-A | 2000 + 2000 | 109.4 | 33.9 A | 190.3 | 29.9 a | 181.5 | 29.1 A | 215.4 | 31.5 A |
| 10. OR-198-A + OR-161-B-3-A | 3000 + 2000 | 107.8 | 33.9 A | 194.8 | 29.8 a | 195.5 | 28.7 A | 218.4 | 31.1 A |
| C.V. (%) | | 2.48 | | 5.32 | | 11.7 | | 10.19 | |
| Growth stages - BBCH Scale | | 51 | | 56 | | 67 | | 71 | |

*means followed by the same letter in the column do not differ statistically at 5% of probability by Tukey test.
**All treatments used Wetcit ® at a rate of 500 mL c.p. ha$^{-1}$ Fruit Diameter, Fruit Weight, Juice Content and Brix The means for fruit diameter and fruit weight are shown in Table 8. It is possible to notice a positive increase in all treatments.

Assessments done focusing on juice content per fruit demonstrated a significant increase for all treatments, however the most effective sprays were either mixture of OR-198-A+OR-210 or OR-161-B-3-A. Brix also showed an increase.

TABLE 8

Fruit diameter (mm), fruit weight (g), juice content per fruit (g) and Brix measured during the progress of Experiment (trial) #1. Arapongas, Paraná, Brasil, 2017/2018.

| Treatments ** (Product Code) | Rate (mL c. p. ha$^{-1}$) | Fuit Diameter (mm) | Fuit Weight (g) | Juice content per fruit (g) * | ° Brix |
|---|---|---|---|---|---|
| 1. Untreated plot | — | 38.3 a | 35.2 A | 54.2 D | 8.2 A |
| 2. OR-198-A | 1000 | 40.0 a | 44.2 A | 59.3 cd | 8.9 A |
| 3. OR-198-A | 2000 | 40.6 a | 47.0 A | 67.2 bc | 9.4 A |
| 4. OR-198-A | 3000 | 40.2 a | 45.0 A | 67.7 abc | 9.2 A |
| 5. OR-198-A + OR-210 | 1000 + 1500 | 42.4 a | 47.1 A | 73.5 ab | 8.9 A |
| 6. OR-198-A + OR-210 | 2000 + 1500 | 40.2 a | 47.4 A | 77.8 a | 8.9 A |
| 7. OR-198-A + OR-210 | 3000 + 1500 | 38.7 a | 39.7 A | 74.6 ab | 8.8 A |
| 8. OR-198-A + OR-161-B-3-A | 1000 + 2000 | 41.5 a | 49.9 A | 74.9 ab | 8.7 A |
| 9. OR-198-A + OR-161-B-3-A | 2000 + 2000 | 43.1 a | 42.5 A | 69.0 abc | 8.6 A |
| 10. OR-198-A + OR-161-B-3-A | 3000 + 2000 | 40.8 a | 46.1 A | 69.9 abc | 9.0 A |
| C.V. (%) | | 5.46 | 11.44 | 6.32 | 8.79 |
| Growth stages-BBCH Scale | | 74 | 74 | 89 | 89 |

* means followed by the same letter in the column do not differ statistically at 5% of probability by Tukey test.
** All treatments used Wetcit ® at a rate of 500 mL c.p.ha$^{-1}$ Fruit Parameters and Yield Parameters According to the Table 9, it can be observed that the application of OR-198-A influenced fruit parameters, such as, diameter and fruit height, as well as the number of seeds per fruit. For fruit diameter the interaction between OR-198-A and OR-161-B-3-A were positive in this experiment. For fruit height, the best results were obtained when OR-198-A was applied alone. The mean number of seeds per fruit was significantly influenced by the treatments, regardless what type of treatment was used.

For the yield parameters, significant incremental responses were also verified by the analysis of variance and mean separation test (Table 10). The fruit set per tree was significantly influenced when spraying OR-198-A (on its own) or in the tank mixture with OR-210 or OR-161-B-3-A, however with more expressive responses in the mixture of OR-161-B-3-A. The average of fruit weight underwent incremental responses in both cases, on its own or in the tank mixture.

In response to the significant increase in levels for fruit set and average of fruit weight, yield was also significantly influenced by the treatments, either applying OR-198-A on its own or in the tank mixture. However, applying OR-198-A in mixture with OR-161-B-3-A had a tendency to be superior in relation to the other treatments. The relative increase in yield was 11.7%, 22.8% and 30.2%, for application of OR-198-A, OR-198-A+OR-210 and OR-198-A+OR-161-B-3-A, respectively.

TABLE 9

Fruit and yield parameters during the progress of Experiment (trial) #1. Arapongas, Paraná, Brasil, 2017/2018.

| Treatments** (Product code) | Rate (mL c.p. ha$^{-1}$) | Fruit parameters | | | Yield parameters* | | | Relative increase (%) |
|---|---|---|---|---|---|---|---|---|
| | | Diameter (mm) | Height (mm) | Seeds (#) | Fruit set/tree (#) | Fruit weight (g) | Yield (Kg/ha) | |
| 1. Untreated plot | — | 51.0 a | 56.2 b | 5.4 B | 129.0 b | 170.9 b | 8993.6 B | — |
| 2. OR-198-A | 1000 | 55.2 a | 60.5 ab | 7.7 A | 141.3 ab | 174.2 ab | 10052.5 Ab | 11.8 |
| 3. OR-198-A | 2000 | 55.2 a | 60.0 ab | 8.4 A | 137.3 ab | 174.3 ab | 9766.9 Ab | 8.6 |
| 4. OR-198-A | 3000 | 56.6 a | 61.4 ab | 7.8 A | 136.8 ab | 185.2 ab | 10304.1 Ab | 14.6 |
| 5. OR-198-A + OR-210 | 1000 + 1500 | 56.5 a | 61.6 a | 8.2 A | 143.3 a | 188.2 ab | 10969.0 Ab | 22.0 |
| 6. OR-198-A + OR-210 | 2000 + 1500 | 57.1 a | 62.4 a | 7.8 A | 141.5 ab | 187.8 ab | 10830.3 Ab | 20.4 |
| 7. OR-198-A + OR-210 | 3000 + 1500 | 57.2 a | 63.6 a | 8.5 A | 141.8 ab | 196.2 ab | 11344.4 Ab | 26.1 |
| 8. OR-198-A + OR-161-B-3-A | 1000 + 2000 | 58.2 ab | 63.6 a | 7.8 A | 146.3 a | 199.4 ab | 11890.2 A | 32.2 |
| 9. OR-198-A + OR-161-B-3-A | 2000 + 2000 | 57.6 ab | 62.4 a | 8.1 A | 145.3 a | 202.9 a | 12061.1 A | 34.1 |
| 10. OR 198-A + OR-161-B-3 A | 3000 + 2000 | 56.8 b | 61.5 a | 8.2 A | 145.3 a | 188.9 ab | 11179.3 Ab | 24.3 |
| C.V. (%) | | 13.6 | 12.9 | 2.76 | 3.99 | 1.79 | 10.16 | |
| Growth stages - BBCH Scale | | | | | 81 | | | |

*means followed by the same letter in the column do not differ statistically at 5% of probability by Tukey test.
**All treatments used Wetcit ® at a rate of 500 mL c.p. ha$^{-1}$ PCR Results According to the summarized results of the PCR analysis, most of the plots indicated the presence of *Candidatus Liberibacter*. Without being limited to theory, when the bacterium is already colonizing the sap conducting vessels the treatments present a significant recovery in the photosynthesis parameter/variable, which implies that there is a reduction of the symptoms, even if the plant is already sick.

TABLE 10

PCR test for presence or absence of *Candidatus liberibacter*

| Treatments** | Rate | Replicates* | | | |
|---|---|---|---|---|---|
| (Product code) | (mL c. p. ha$^{-1}$) | I | II | III | IV |
| 1. Untreated plot | – | + | + | – | + |
| 2. OR-198-A | 1000 | + | + | + | + |
| 3. OR-198-A | 2000 | + | – | + | + |
| 4. OR-198-A | 3000 | + | + | + | + |
| 5. OR-198-A + OR-210 | 1000 + 1500 | + | + | + | + |
| 6. OR-198-A + OR-210 | 2000 + 1500 | + | + | + | + |
| 7. OR-198-A + OR-210 | 3000 + 1500 | + | + | – | + |
| 8. OR-198-A + OR-161-B-3-A | 1000 + 2000 | + | + | + | + |
| 9. OR-198-A + OR-161-B-3-A | 2000 + 2000 | + | + | + | + |
| 10. OR-198-A + OR-161-B-3-A | 3000 + 2000 | + | + | + | + |
| Growth stages-BBCH Scale | | 74 | | | |

* (+ red) = *Candidatus Liberibacter* detected. (– green) = *Candidatus liberibacter* not detected.
** All treatments was used Wetcit ® at a rate of 500 mL c.p.ha$^{-1}$ Experiment #2

Photosynthesis (μmol/m2/s)

The means for the photosynthetic rate in the second set of trials are shown in Table 11. It can be observed that, as in Experiment 1, the plots were under conditions of homogeneity, previous evaluation performed on 9 Jun. 2017, and there were no significant differences between them giving reliability to the results in the subsequent evaluations after the treatments.

At 29 days after application (DAA) it was possible to detect positive differences in photosynthetic rate considering the proposed statistical analysis. This allows one to infer that the treatments used in this evaluation were efficient enough to raise the photosynthetic level of the *Citrus* plants that were subjected to the treatments. It is important to note that even though the first evaluation was carried out after a single application, it has been noted that the association in this case, OR-198-A+OR-161-B-3-A brought the photosynthesis levels to a higher level.

Considering the evaluation at 63 DAA, the differences become even greater, reinforcing that the treatments imply an increase in the photosynthesis. This is particularly evident in the mixture of OR-198-A+OR-161-B-3-A. Considering the same evaluation date and the use of isolated products, the values given by the statistical analysis between the products OR-198-A and OR-198-B were similar.

In the evaluation at 96 DAA it is still possible to highlight the values when there was an association between the product OR-198-A+OR-161-B-3-A, thus showing a possible interaction between the products in the photosynthesis parameter.

TABLE 11

Photosynthesis rate measured during the progress of Experiment (trial) #2.
Arapongas, Paraná, Brasil, 2017/2018.

| | | Photosynthesis (1.1mol/m2/s)* | | | |
|---|---|---|---|---|---|
| Treatments (Productcode) | Rate (mL c. p. ha$^{-1}$) | Preview (09/06/17) | 29 D.A.1$^{st}$ A. (10/05/17) | 63 D.A.1$^{st}$ A. (11/08/17) | 96 D.A.1$^{st}$ A. (12/11/17) |
| 1. Untreated plot | – | 35.0 a | 32.8 ab | 36.9 Bc | 42.8 D |
| 2. OR-198-A + Wetcit ® | 2000 + 500 | 30.6 a | 38.2 ab | 59.4 Abc | 71.7 Bc |
| 3. OR-198-A + Wetcit ® | 3000 + 500 | 40.0 a | 25.5 b | 58.0 Abc | 62.4 Bcd |
| 4. OR-198-A + Wetcit ® | 4000 + 500 | 33.3 a | 25.1 b | 50.9 Abc | 56.8 Bcd |
| 5. OR-198-B + Wetcit ® | 2000 + 500 | 39.1 a | 47.8 ab | 76.1 Abc | 84.7 B |
| 6. OR-198-B + Wetcit ® | 3000 + 500 | 38.3 a | 49.3 ab | 80.9 Abc | 82.3 B |
| 7. OR-198-B + Wetcit ® | 4000 + 500 | 32.6 a | 43.8 ab | 77.1 Abc | 81.5 Bc |
| 8. OR-161-B-3-A + OR-345 | 2000 + 1500 | 41.1 a | 36.5 ab | 42.7 C | 52.0 Cd |
| 9. OR-161-B-3-A + OR-345 | 3000 + 1500 | 34.9 a | 30.3 ab | 42.0 Abc | 61.9 Bcd |
| 10. OR-161-B-3-A + OR-345 | 4000 + 1500 | 40.3 a | 52.4 ab | 58.1 Abc | 68.6 Bcd |
| 11. OR-198 + OR-161-B-3-A + OR-345 | 2000 + 2000 + 1500 | 34.6 a | 77.8 a | 98.7 A | 141.7 A |
| 12. OR-198 + OR-161-B-3-A + OR-345 | 3000 + 2000 + 1500 | 29.5 a | 79.5 a | 87.6 Ab | 153.7 A |
| 13. OR-198 + OR-161-B-3-A + OR-345 | 4000 + 2000 + 1500 | 33.9 a | 76.2 a | 105.7 A | 145.9 A |
| C.V. (%) | | 8.51 | 12.35 | 9.65 | 4.51 |
| Growth stages-BBCH Scale | | 56 | 67 | 71 | 72 |

* means followed by the same letter in the column do not differ statistically at 5% of probability by Tukey test.

Transpiration (mol/m²/s)

Below, the means for leaf transpiration are estimated by the "Porometer" according to the evaluations, Table 12.

As in Experiment #1, it was observed that there is a positive increase in transpiration by spray application of the treatments. Transpiration is complex, and without being limited to theory it is thought that more processes may be related to the increase of photosynthesis, and not only the rate of transpiration as shown in both experiments.

TABLE 12

Transpiration (TR) measured during the progress of Experiment (trial) #2. Arapongas, Paraná, Brasil, 2017/2018.

| | | Transpiration (mmol/m²/s) (TR)* | | | | | | |
|---|---|---|---|---|---|---|---|---|
| Treatments | Rate (mL c.p. | Preview (Sep. 6, 2017) | | 29 D.A. 1$^{st}$A. (Oct. 5, 2017) | | 63 D.A. 1$^{st}$A (Nov. 8, 2017) | | 96 D.A. 1$^{st}$A (Dec. 11, 2017) | |
| (Product code) | ha$^{-1}$) | TR | °C. | TR | °C. | TR | °C. | TR | °C. |
| 1. Untreated plot | — | 134.9 | 35.0 a | 130.58 | 27.4 a | 148.9 | 30.7 A | 139.8 | 30.3 A |
| 2. OR-198-A + Wetcit ® | 2000 + 500 | 129.6 | 35.0 a | 179.65 | 26.9 a | 181.8 | 30.2 A | 169.8 | 30.9 A |
| 3. OR-198-A + Wetcit ® | 3000 + 500 | 130.2 | 28.5 a | 169.28 | 26.7 a | 167.0 | 30.9 A | 156.4 | 31.1 A |
| 4. OR-198-A + Wetcit ® | 4000 + 500 | 127.5 | 33.2 a | 151.38 | 27.6 a | 155.2 | 23.9 A | 153.8 | 31.2 A |
| 5. OR-198-B + Wetcit ® | 2000 + 500 | 129.4 | 35.0 a | 171.95 | 25.3 a | 159.3 | 24.0 A | 170.3 | 29.7 A |
| 6. OR-198-B + Wetcit ® | 3000 + 500 | 138.1 | 33.5 a | 178.33 | 26.4 a | 167.5 | 20.1 A | 156.8 | 27.7 A |
| 7. OR-198-B + Wetcit ® | 4000 + 500 | 135.8 | 26.7 a | 191.55 | 28.1 a | 166.9 | 24.1 A | 158.9 | 26.1 A |
| 8. OR-161-B-3-A + OR-345 | 2000 + 1500 | 133.4 | 23.0 a | 144.95 | 28.0 a | 138.5 | 25.6 A | 154.6 | 27.7 A |
| 9. OR-161-B-3-A + OR-345 | 3000 + 1500 | 127.3 | 23.1 a | 136.48 | 27.6 a | 137.9 | 25.2 A | 153.6 | 30.0 A |
| 10. OR-161-B-3-A + OR-345 | 4000 + 1500 | 124.5 | 30.6 a | 162.35 | 25.6 a | 162.1 | 27.4 A | 166.5 | 29.3 A |
| 11. OR-198-A + OR-161-B-3-A + OR-345 | 2000 + 2000 + 1500 | 122.2 | 32.0 a | 157.98 | 25.0 a | 189.1 | 27.3 A | 179.3 | 28.9 A |
| 12. OR-198-A + OR-161-B-3-A + OR-345 | 3000 + 2000 + 1500 | 124.9 | 33.1 a | 165.83 | 24.7 a | 207.2 | 28.4 A | 193.0 | 29.4 A |
| 13. OR-198-A + OR-161-B-3-A + OR-345 | 4000 + 2000 + 1500 | 139.9 | 31.0 a | 162.28 | 24.3 a | 200.1 | 30.5 A | 181.8 | 29.8 A |
| C.V. (%) | | 7.95 | | 6.51 | | 6.28 | | 5.25 | |
| Growth stages - BBCH Scale | | 56 | | 67 | | 71 | | 72 | |

*means followed by the same letter in the column do not differ statistically at 5% of probability by Tukey test.

Fruit Diameter and Fruit Weight

According to Table 13, it is possible to observe the calculated means for fruit diameter and fruit weight.

For fruit diameter, an increment was observed when the treatments were applied. The most expressive results were obtained spraying the association of OR-198-A+OR-161-B-3-A.

For fruit weight, increments are also observed, but all treatments are statistically the same.

Juice content were significative influenced by the treatments done in the trial. The most evident results were obtained when the mixture OR-198-A+OR-161-B-3-A was applied.

TABLE 13

Fruit diameter (mm) and fruit weight (g) measured during the progress of Experiment (trial) #2. Arapongas, Paraná, Brasil, 2017/2018.

| Treatments (Product code) | Rate (mL c. p. ha$^{-1}$) | Fuit Diameter (mm) | Weight (g) | Juice content per fruit (g) | °Brix |
|---|---|---|---|---|---|
| 1. Untreated plot | – | 39.3 c | 37.8 b | 68.6 b | 9.2 A |
| 2. OR-198-A + Wetcit ® | 2000 + 500 | 41.6 c | 47.9 ab | 80.7 ab | 9.1 A |
| 3. OR-198-A + Wetcit ® | 3000 + 500 | 42.9 bc | 48.4 ab | 78.7 ab | 9.0 A |
| 4. OR-198-A + Wetcit ® | 4000 + 500 | 42.1 bc | 48.4 ab | 73.9 ab | 9.0 A |
| 5. OR-198-B + Wetcit ® | 2000 + 500 | 40.1 c | 49.1 ab | 79.2 ab | 9.0 A |
| 6. OR-198-B + Wetcit ® | 3000 + 500 | 39.6 c | 44.2 ab | 79.0 ab | 9.0 A |
| 7. OR-198-B + Wetcit ® | 4000 + 500 | 42.9 bc | 54.5 a | 76.3 ab | 8.9 A |
| 8. OR-161-B-3-A + OR-345 | 2000 + 1500 | 42.8 bc | 41.7 ab | 75.8 ab | 8.8 A |
| 9. OR-161-B-3-A + OR-345 | 3000 + 1500 | 40.6 c | 42.6 ab | 81.6 ab | 8.7 A |

TABLE 13-continued

Fruit diameter (mm) and fruit weight (g) measured during the progress of Experiment (trial) #2. Arapongas, Paraná, Brasil, 2017/2018.

| Treatments (Product code) | Rate (mL c. p. ha$^{-1}$) | Fruit Diameter (mm) | Weight (g) | Juice content per fruit (g) | ° Brix |
|---|---|---|---|---|---|
| 10. OR-161-B-3-A + OR-345 | 4000 + 1500 | 40.9 c | 45.2 ab | 75.9 ab | 8.6 A |
| 11. OR-198-A + OR-161-B-3-A + OR-345 | 2000 + 2000 + 1500 | 47.0 abc | 49.1 ab | 85.1 a | 8.3 A |
| 12. OR-198-A + OR-161-B-3-A + OR-345 | 3000 + 2000 + 1500 | 49.9 ab | 54.9 a | 87.8 a | 8.2 A |
| 13. OR-198-A + OR-161-B-3-A + OR-345 | 4000 + 2000 + 1500 | 51.3 a | 55.5 a | 79.9 ab | 8.1 a |
| C.V. (%) | | 7.45 | 6.81 | 7.36 | 10.25 |
| Growth stages-BBCH Scale | | 74 | 74 | 89 | 89 |

* means followed by the same letter in the column do not differ statistically at 5% of probability by Tukey test.

Fruit Parameters and Yield Parameters

In Table 14, it is possible to observe the significant differences between the averages calculated for fruit parameters, such as diameter and height. The increase in these variables was influenced by the applications, mainly by the product OR-198-B and the tank mixture OR-198-A+OR-161-B-3-A. The mean number of seeds per fruit was significantly increased by the treatments, where the interaction of OR-198-A+OR-161-B-3-A was more responsive.

For yield parameters, significant incremental responses were also verified by analysis of variance and mean separation test (Table 14). The fruit set per tree was increased when applications were done, especially when the tank mix OR-198-A+OR-161-B-3-A was used. For fruit weight, either application of OR-198-B or OR-198-A+OR-161-B-3-A were efficient enough to cause incremental responses in this variable.

In response to the variables analyzed (fruit set and fruit weight), the yield was influenced by the treatments application, and the best results achieved for this experiment were by the tank mixture OR-198-A+OR-161-B-3-A, and OR-198-B, the latter being applied on its own. The relative yield increase for this second experiment was 23.5%, 28.0%, 4.3% and 35.2%, for OR-198-A, OR-198-B, OR-161-B-3-A and OR-198-A+OR-161-B-3-A, respectively.

TABLE 14

Fruit and yield parameters during the progress of the Experiment (trial) #2. Arapongas, Paraná, Brasil, 2017/2018.

| Treatments (Product code) | Rate (mL c.p. ha$^{-1}$) | Fruit parameters | | | Yield parameters | | | Relative increase (%) |
|---|---|---|---|---|---|---|---|---|
| | | Diameter (mm) | Height (mm) | Seeds (#) | Fruit set/tree (#) | Fruit weight (g) | Yield (Kg/ha) | |
| 1. Untreated plot | — | 49.1 b | 53.7 b | 4.9 F | 133.0 bc | 148.4 d | 8044.1 d | — |
| 2. OR-198-A + Wetcit ® | 2000 + 500 | 56.3 a | 61.0 a | 6.8 Bcde | 137.8 abc | 183.4 a | 10303.1 a | 28.1 |
| 3. OR-198A + Wetcit ® | 3000 + 500 | 54.7 ab | 59.3 ab | 6.8 Bcde | 134.8 abc | 178.2 ab | 9786.6 abc | 21.7 |
| 4. OR-198A + Wetcit ® | 4000 + 500 | 55.3 ab | 60.4 a | 6.9 Bcde | 134.5 abc | 176.9 abc | 9704.1 abcd | 20.6 |
| 5. OR-198-B + Wetcit ® | 2000 + 500 | 56.7 a | 61.6 a | 7.4 abc | 138.3 abc | 185.9 a | 10507.0 a | 30.6 |
| 6. OR-198-B + Wetcit ® | 3000 + 500 | 55.6 a | 60.2 a | 7.2 abcd | 136.3 abc | 183.8 a | 10218.2 ab | 27.0 |
| 7. OR-198 B + Wetcit ® | 4000 + 500 | 56.1 a | 60.5 a | 7.4 ab | 134.8 abc | 185.0 a | 10174.4 ab | 26.5 |
| 8. OR-161-B-3-A + OR 345 | 2000 +1500 | 54.6 ab | 60.0 ab | 6.1 ef | 133.8 abc | 152.0 cd | 8296.4 cd | 3.1 |
| 9. OR-161-B-3-A + OR-345 | 3000 + 1500 | 54.0 ab | 59.4 ab | 6.4 def | 132.3 c | 153.9 bcd | 8309.3 cd | 3.3 |
| 10. OR-161-B-3-A + OR-345 | 4000 + 1500 | 53.8 ab | 59.3 ab | 6.4 cdef | 134.3 abc | 156.4 bcd | 8566.8 bcd | 6.5 |
| 11. OR-198-A + OR-161-B-3-A + OR-345 | 2000 + 2000 + 1500 | 55.8 a | 60.7 a | 7.9 a | 141.0 ab | 187.6 a | 10785.9 a | 34.1 |
| 12. OR-198-A + OR-161-B-3-A + OR-345 | 3000 + 2000 + 1500 | 55.9 a | 62.9 a | 7.4 ab | 142.5 a | 189.2 a | 10982.1 a | 36.5 |
| 13. OR-198-A + OR-161-B-3-A + OR-345 | 4000 + 2000 + 1500 | 56.1 a | 62.0 a | 7.6 ab | 142.8 a | 186.5 a | 10852.4 a | 34.9 |
| C.V. (%) | | 4.52 | 4.32 | 20.4 | 13.13 | 5.77 | 6.84 | |
| Growth stages - BBCH Scale | | | | 81 | | | | |

PCR Results

In the same way as in Experiment #1, most of the plots indicated the presence of the bacterium *Candidatus liberibacter*. However, the repetition of the photosynthesis results in both trials indicates the spray of the treatments brings benefits to the recovery of HLB symptoms. As such, the disclosures herein above described provides for a method to control and/or treat and/or curb HLB in *Citrus* plants.

TABLE 15

PCR test for presence or absence of *Candidatus liberibacter* (Experiment #2).

| Treatments (Product code) | Rate (mL c. p. $ha^{-1}$) | Replicates* I | II | III | IV |
|---|---|---|---|---|---|
| 1. Untreated plot | – | + | + | + | + |
| 2. OR-198-A + Wetcit ® | 2000 + 500 | + | + | + | + |
| 3. OR-198-A + Wetcit ® | 3000 + 500 | + | + | + | + |
| 4. OR-198-A + Wetcit ® | 4000 + 500 | + | + | + | + |
| 5. OR-198-B + Wetcit ® | 2000 + 500 | + | + | + | + |
| 6. OR-198-B + Wetcit ® | 3000 + 500 | + | + | + | + |
| 7. OR-198-B + Wetcit ® | 4000 + 500 | + | + | + | + |
| 8. OR-161-B-3-A + OR-345 | 2000 + 1500 | + | + | + | + |
| 9. OR-161-B-3-A + OR-345 | 3000 + 1500 | + | + | + | + |
| 10. OR-161-B-3-A + OR-345 | 4000 + 1500 | + | – | + | + |
| 11. OR-198 + OR-161-B-3-A + OR-345 | 2000 + 2000 + 1500 | + | + | + | + |
| 12. OR-198 + OR-161-B-3-A + OR-345 | 3000 + 2000 + 1500 | + | + | + | + |
| 13. OR-198 + OR-161-B-3-A + OR-345 | 4000 + 2000 + 1500 | + | + | + | + |
| Growth stages-BBCH Scale | 74 | | | | |

*(+ red) = *Candidatus Liberibacter* detected. (– green) = *Candidatus Liberibacter* not detected.

Based on the results obtained and interpreted in Experiments 1 and 2, it can be concluded that:

a) The spraying of both OR-198 A and B formulations is responsive and positive in the parameters of photosynthesis, fruit size, fruit weight, fruit set, juice content and yield, and reduces the symptoms of HLB.

b) It is recommended to mix the OR-161-B-3-A formulation when spraying the OR-198-A formulation for higher physiological results to obtain more expressive results;

c) It is recommended to use 2000 up to 3000 mL·ha−1 of the OR-198 formulations.

d) It is recommended the use of OR-345 (containing Tannic acid)+OR-161-B-3-A+OR-198 comparing with commercial adjuvant+OR-198 formulations.

It was noted as a very good and unexpected collateral effect using the products of the invention whereby a significant increasing of insect control was observed such as reduction of psyllid population in all stages (eggs, nymphs and adults) and an improvement of other diseases control such as reduction of damages from rust mite, leprosis mite and black spot, as examples. Field trials were under evaluation in some locations of Brazil and USA and in other type of trees such as grapes, olives, and some fruits and vegetables to demonstrate the performance of products of the invention.

Field trials were under evaluation in some locations of Brazil and USA in long term field trials to demonstrate the recovery and control of greening, with field trials contracted and running in official institutions of Brazil, USA, China, as examples.

FIG. 10 shows electron micrographs through leaves of *Citrus* trees wherein (a) shows a cross section through a *Citrus* plant suffering from HLB and untreated, and wherein (b) shows a cross section through a *Citrus* plant suffering from HLB but having been treated with an agricultural composition in accordance with this invention. (a) shows bacterial blockages in the vascular system as shown by the headed arrows and (b) shows amelioration of the bacterial blockages in the vascular system after treatment with an embodiment of the invention having formulation code ORO-345 as described herein above. It is clear that the invention ameliorates vascular disease particularly HLB in *Citrus* plants.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments can be understood and effected by those skilled in the art in practicing the claimed disclosure, from a study of the drawings, the disclosure and the appended claims.

All references cited herein are incorporated herein by reference in their entirety. To the extent publications and patents or patent applications incorporated by reference contradict the disclosure contained in the specification, the specification is intended to supersede and/or take precedence over any such contradictory material.

Unless otherwise defined, all terms (including technical and scientific terms) are to be given their ordinary and customary meaning to a person of ordinary skill in the art, and are not to be limited to a special or customized meaning unless expressly so defined herein. It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term 'including' should be read to mean 'including, without limitation,' 'including but not limited to,' or the like; the term 'comprising' as used herein is synonymous with 'including,' 'containing,' or 'characterized by,' and is inclusive or open-ended and does not exclude additional, unrecited elements or method steps; the term 'having' should be interpreted as 'having at least;' the term 'includes' should be interpreted as 'includes but is not limited to;' the term 'example' is used to provide exemplary instances of the item in discussion, not an exhaustive or limiting list thereof; adjectives such as 'known', 'normal', 'standard', and terms of similar meaning should not be construed as limiting the item described to a given time period or to an item available as of a given time, but instead should be read to encompass known, normal, or standard technologies that may be available or known now or at any time in the future; and use of terms like 'preferably,' 'preferred,' 'desired,' or 'desirable,' and words of similar meaning should not be understood as implying that certain features are critical, essential, or even important to the structure or function of the invention, but instead as merely intended to highlight alternative or additional features that may or may not be utilized in a particular embodiment of the invention. Likewise, a group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise.

Where a range of values is provided, it is understood that the upper and lower limit, and each intervening value between the upper and lower limit of the range is encompassed within the embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities of ingredients, reaction conditions, and so forth used in the specification are to be understood as being modified in all instances by the term 'about.' Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

Furthermore, although the foregoing has been described in some detail by way of illustrations and examples for purposes of clarity and understanding, it is apparent to those skilled in the art that certain changes and modifications may be practiced. Therefore, the description and examples should not be construed as limiting the scope of the invention to the specific embodiments and examples described herein, but rather to also cover all modification and alternatives coming with the true scope and spirit of the invention.

What is claimed:

1. A liquid agricultural adjuvant for controlling and/or treating *Citrus* greening disease or Huanglongbing disease (HLB) in *Citrus* trees, the liquid agricultural adjuvant comprising:
   at least one *Citrus* oil;
   at least one anionic surfactant selected from the group consisting of: ($C_6$-$C_{18}$) alkyl benzene sulfonic acid salts, calcium dodecylbenzene sulfonate, sodium dodecylbenzene sulfonate, sodium alkyl benzene sulfonate, ($C_6$-$C_{18}$) alkyl ether sulfates, ($C_6$-$C_{18}$) alkyl ethoxylated ether sulfates, ($C_6$-$C_{18}$) alkyl sulfates, sodium lauryl ether sulfate, lauryl ether polyethoxylated sodium sulfate, ($C_6$-$C_{18}$) alkyl phosphate esters, ($C_6$-$C_{18}$) alkoxylated sulfates, ($C_6$-$C_{18}$) alkoxylated phosphate esters, and combinations thereof;
   at least one nonionic surfactant selected from the group consisting of ($C_8$-$C_{22}$) ethoxylated fatty alcohols; and
   tannic acid.

2. The liquid agricultural adjuvant of claim 1 having from 0.1 wt. % to 20 wt. % of the at least one *Citrus* oil, from 0.1 wt. % to 25 wt. % of tannic acid, the at least one anionic surfactant present in an amount of between 1 wt. % to 50 wt. %, and the at least one nonionic surfactant present in an amount of between 1 wt. % to 50 wt. %, thereby providing the liquid agricultural adjuvant in concentrate form.

3. The liquid agricultural adjuvant of claim 2 further comprising from 0.1% to 80% of a nutrient compound provided as a fertilizer composition, wherein the fertilizer composition includes at least one selected from the group consisting of nitrogen (N), potassium (K), calcium (Ca), sulfur(S), boron (B), copper (Cu), manganese (Mn), and zinc (Zn).

4. The liquid agricultural adjuvant of claim 3, wherein the fertilizer composition is monoethanolamine borate.

5. The liquid agricultural adjuvant of claim 3, wherein the fertilizer composition is sodium borate.

6. The liquid agricultural adjuvant of claim 1, further comprising an additive selected from the group consisting of preservatives, clarifiers, anti-freezing agents, hydrotropes, stabilizers, antioxidants, acidifiers, chelates, complexing agents, dyes, rheology modifiers, antifoams, anti-drift and water, and combinations thereof.

7. The liquid agricultural adjuvant of claim 1, wherein the *Citrus* oil is selected from the group consisting of orange oil, grapefruit oil, lemon oil, lime oil, tangerine oil, murcott mandarin oil, and combinations thereof.

8. The liquid agricultural adjuvant of claim 1, wherein the tannic acid is obtained from at least one selected from the group consisting of Tara pods (*Caesalpinia spinosa*), Gallnuts (*Rhus semialata* or *Quercus infectoria*), Sicilian Sumac leaves (*Rhus coriaria*), Turkish or Chinese nutgall (*Rhus* species), European chestnut tree (*Castanea sativa*), American chestnut oak (*Quercus prinus*) and wattles (*Acacia* species).

9. The liquid agricultural adjuvant of claim 1, wherein the tannic acid is formulated as a liquid.

10. The liquid agricultural adjuvant of claim 1, wherein the tannic acid is provided in a concentrated or dilute form.

\* \* \* \* \*